(12) United States Patent
Shirai

(10) Patent No.: US 9,499,224 B2
(45) Date of Patent: Nov. 22, 2016

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 57 days.

(21) Appl. No.: 14/300,172

(22) Filed: Jun. 9, 2014

(65) Prior Publication Data

US 2015/0232142 A1 Aug. 20, 2015

Related U.S. Application Data

(63) Continuation-in-part of application No. 14/185,784, filed on Feb. 20, 2014.

(51) Int. Cl.
*B62J 1/08* (2006.01)
*B62K 19/36* (2006.01)

(52) U.S. Cl.
CPC .................. *B62J 1/08* (2013.01); *B62K 19/36* (2013.01); *B62J 2001/085* (2013.01); *Y10T 403/32426* (2015.01)

(58) Field of Classification Search
CPC ..... B62K 19/36; B62J 1/08; B62J 2001/085; Y10T 403/32426
USPC .............................. 248/161, 157; 297/195.1
See application file for complete search history.

(56) References Cited

U.S. PATENT DOCUMENTS

| 3,406,587 A | 10/1968 | Brilando et al. |
| 3,443,825 A | 5/1969 | Wolf |
| 3,861,740 A | 1/1975 | Tajima et al. |
| 4,807,856 A | 2/1989 | Teckenbrock |
| 4,872,696 A | 10/1989 | Gill |
| 4,924,723 A | 5/1990 | Cristie |
| 4,938,733 A | 7/1990 | Patterson |
| 5,007,675 A | 4/1991 | Musto et al. |
| 5,044,592 A * | 9/1991 | Cienfuegos ............ B62K 19/36 248/408 |

(Continued)

FOREIGN PATENT DOCUMENTS

| AT | 216373 B | 7/1961 |
| DE | 29806919 U1 | 8/1998 |

(Continued)

OTHER PUBLICATIONS

Office Action with Form PTO-892 Notice of References Cited issued by the U.S. Patent and Trademark Office for the corresponding U.S. Appl. No. 14/185,784, Oct. 2, 2015.

(Continued)

*Primary Examiner* — Milton Nelson, Jr.
(74) *Attorney, Agent, or Firm* — Mori & Ward, LLP

(57) ABSTRACT

A bicycle seatpost assembly comprises a first cylinder, a second cylinder, and a positioning structure. The second cylinder is configured to be telescopically received in the first cylinder. The positioning structure is configured to relatively position the first cylinder and the second cylinder. The positioning structure is configured to switch a state of the bicycle seatpost assembly among a first adjustable state and a second adjustable state. In the first adjustable state, a positional relationship between the first cylinder and the second cylinder is continuously adjustable within a first adjustable position range. In the second adjustable state, the positional relationship between the first cylinder and the second cylinder is continuously adjustable within a second adjustable position range different from the first adjustable position range.

24 Claims, 22 Drawing Sheets

(56) References Cited

U.S. PATENT DOCUMENTS

| | | |
|---|---|---|
| 5,149,034 A | 9/1992 | Ganaja |
| 5,370,017 A | 12/1994 | Krauer |
| 5,577,969 A | 11/1996 | Watarai |
| 5,682,794 A | 11/1997 | Shibata |
| 5,829,733 A | 11/1998 | Becker |
| 5,881,602 A | 3/1999 | Cirami |
| 6,502,477 B1 | 1/2003 | Assel |
| 2006/0260428 A1 | 11/2006 | Kawakami et al. |
| 2007/0068316 A1 | 3/2007 | Kawakami et al. |
| 2008/0007098 A1* | 1/2008 | Girard .................... A47C 9/025 297/195.1 |
| 2011/0204201 A1 | 8/2011 | Kodama et al. |
| 2011/0257848 A1* | 10/2011 | Shirai .................... B62K 19/36 701/49 |
| 2013/0119634 A1* | 5/2013 | Camp ....................... B62J 1/08 280/287 |

FOREIGN PATENT DOCUMENTS

| | | |
|---|---|---|
| DE | 10 2011 012 063 | 8/2011 |
| EP | 1764298 | 3/2007 |
| GB | 442311 | 2/1936 |
| JP | 4040057 B2 | 3/2007 |

OTHER PUBLICATIONS

Office Action with Form PTO-892 Notice of References Cited issued by the U.S. Patent and Trademark Office for the U.S. Appl. No. 14/185,784, Mar. 26, 2015.

Office Action with Form PTO-892 Notice of References Cited issued by the U.S. Patent and Trademark Office for the parent U.S. Appl. No. 14/185,784, Jun. 16, 2016.

* cited by examiner

BICYCLE SEATPOST ASSEMBLY

CROSS-REFERENCE TO RELATED APPLICATIONS

The present application is a continuation-in-part application of the U.S. patent application Ser. No. 14/185,784 filed Feb. 20, 2014. The contents of this application are incorporated herein by reference in their entirety.

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device. Another bicycle component that has been extensively redesigned is a bicycle seatpost assembly.

SUMMARY OF THE INVENTION

In accordance with a first aspect of the present invention, a bicycle seatpost assembly comprises a first cylinder, a second cylinder, and a positioning structure. The second cylinder is configured to be telescopically received in the first cylinder. The positioning structure is configured to relatively position the first cylinder and the second cylinder. The positioning structure is configured to switch a state of the bicycle seatpost assembly among a first adjustable state and a second adjustable state. In the first adjustable state, a positional relationship between the first cylinder and the second cylinder is continuously adjustable within a first adjustable position range. In the second adjustable state, the positional relationship between the first cylinder and the second cylinder is continuously adjustable within a second adjustable position range different from the first adjustable position range.

In accordance with a second aspect of the present invention, the bicycle seatpost assembly according to the first aspect is configured so that the first adjustable position range at least partially overlaps with the second adjustable position range.

In accordance with a third aspect of the present invention, the bicycle seatpost assembly according to the first aspect is configured so that the first adjustable position range has a total length different from a total length of the second adjustable position range.

In accordance with a fourth aspect of the present invention, the bicycle seatpost assembly according to the first aspect is configured so that the first adjustable position range is defined between a first maximum overall length and a first minimum overall length of the bicycle seatpost assembly. The second adjustable position range is defined between a second maximum overall length and a second minimum overall length of the bicycle seatpost assembly. The first minimum overall length is different from the second minimum overall length.

In accordance with a fifth aspect of the present invention, the bicycle seatpost assembly according to the fourth aspect is configured so that the first maximum overall length is equal to the second maximum overall length.

In accordance with a sixth aspect of the present invention, the bicycle seatpost assembly according to the first aspect is configured so that the first adjustable position range is defined between a first maximum overall length and a first minimum overall length of the bicycle seatpost assembly. The second adjustable position range is defined between a second maximum overall length and a second minimum overall length of the bicycle seatpost assembly. The first maximum overall length is different from the second maximum overall length.

In accordance with a seventh aspect of the present invention, the bicycle seatpost assembly according to the sixth aspect is configured so that the first minimum overall length is equal to the second minimum overall length.

In accordance with an eighth aspect of the present invention, the bicycle seatpost assembly according to the first aspect is configured so that the positioning structure includes a first chamber, a second chamber, a first passageway, and a second passageway. The first chamber is in communication with the second chamber via the first passageway in the first adjustable state of the bicycle seatpost assembly. The first chamber is in communication with the second chamber via the second passageway in the second adjustable state of the bicycle seatpost assembly. The positioning structure is configured to switch a fluid passageway among the first passageway and the second passageway to switch the state of the bicycle seatpost assembly among the first adjustable state and the second adjustable state.

In accordance with a ninth aspect of the present invention, the bicycle seatpost assembly according to the eighth aspect is configured so that the positioning structure includes a support member, a fluid cylinder and a movable member. The support member is configured to be telescopically movable relative to the fluid cylinder, the movable member being configured to be movable relative to the support member. The movable member is configured to switch the fluid passageway among the first passageway and the second passageway in accordance with a position of the movable member relative to the support member.

In accordance with a tenth aspect of the present invention, the bicycle seatpost assembly according to the ninth aspect is configured so that the first passageway includes a first gate configured to open and close in response to a position of the movable member relative to the support member. The second passageway includes a second gate configured to open and close in response to a position of the movable member relative to the support member and provided at a position different from a position of the first gate.

In accordance with an eleventh aspect of the present invention, the bicycle seatpost assembly according to the tenth aspect is configured so that the first gate is open in a state where the movable member is disposed at a first open position. The first gate and the second gate are open in a state where the movable member is disposed at a second open position different from the first open position relative to the support member.

In accordance with a twelfth aspect of the present invention, the bicycle seatpost assembly according to the eleventh aspect is configured so that the first gate and the second gate are closed in a state where the movable member is disposed at a closed position different from the first open position and the second open position relative to the support member.

In accordance with a thirteenth aspect of the present invention, the bicycle seatpost assembly according to the eleventh aspect is configured so that the second gate is closed in a state where the movable member is disposed at the first open position.

In accordance with a fourteenth aspect of the present invention, the bicycle seatpost assembly according to the eleventh aspect is configured so that the first gate and the second gate are open in a state where the movable member is disposed at a third open position different from the first open position and the second open position relative to the support member. The second gate has a first cross-sectional area in a state where the movable member is disposed at the second open position. The second gate has a second cross-sectional area in a state where the movable member is disposed at the third open position. The second cross-sectional area is smaller than the first cross-sectional area.

In accordance with a fifteenth aspect of the present invention, the bicycle seatpost assembly according to the eleventh aspect is configured so that the movable member is movably mounted to the support member and is configured to protrude from the support member. The movable member protrudes from the support member by a first amount of protrusion in a state where the movable member is disposed at the first open position. The movable member protrudes from the support member by a second amount of protrusion different from the first amount of protrusion in a state where the movable member is disposed at the second open position.

In accordance with a sixteenth aspect of the present invention, the bicycle seatpost assembly according to the tenth aspect is configured so that the fluid cylinder includes an inner peripheral surface and a recessed inner peripheral surface recessed from the inner peripheral surface. The recessed inner peripheral surface defines an inner diameter larger than an inner diameter defined by the inner peripheral surface. The first passageway includes a third gate configured to open and close in response to a relative position between the support member and the recessed inner peripheral surface.

In accordance with a seventeenth aspect of the present invention, the bicycle seatpost assembly according to the sixteenth aspect is configured so that the support member includes a seal member provided on an outer periphery of the support member. The third gate is open in a state where the seal member faces the recessed inner peripheral surface of the fluid cylinder. The third gate is closed in a state where the seal member contacts the inner peripheral surface of the fluid cylinder.

In accordance with an eighteenth aspect of the present invention, the bicycle seatpost assembly according to the ninth aspect is configured so that the first passageway and the second passageway are at least partially disposed between the support member and the movable member.

In accordance with a nineteenth aspect of the present invention, the bicycle seatpost assembly according to the first aspect is configured so that the positioning structure is configured to switch the state of the bicycle seat post assembly among the first adjustable state and the second adjustable state in response to an operation of a bicycle operating device.

In accordance with a twentieth aspect of the present invention, the bicycle seatpost assembly according to the nineteenth aspect is configured so that the positioning structure is configured to switch the state of the bicycle seatpost assembly to the first adjustable state in response to a first operation of the bicycle operating device. The positioning structure is configured to switch the state of the bicycle seatpost assembly to the second adjustable state in response to a second operation of the bicycle operating device. In the bicycle operating device, at least one of a movement amount and a movement direction of the first operation is different from at least one of a movement amount and a movement direction of the second operation.

In accordance with a twenty-first aspect of the present invention, the bicycle seatpost assembly according to the ninth aspect is configured so that the positioning structure is configured to change a position of the movable member relative to the support member in response to an operation of a bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
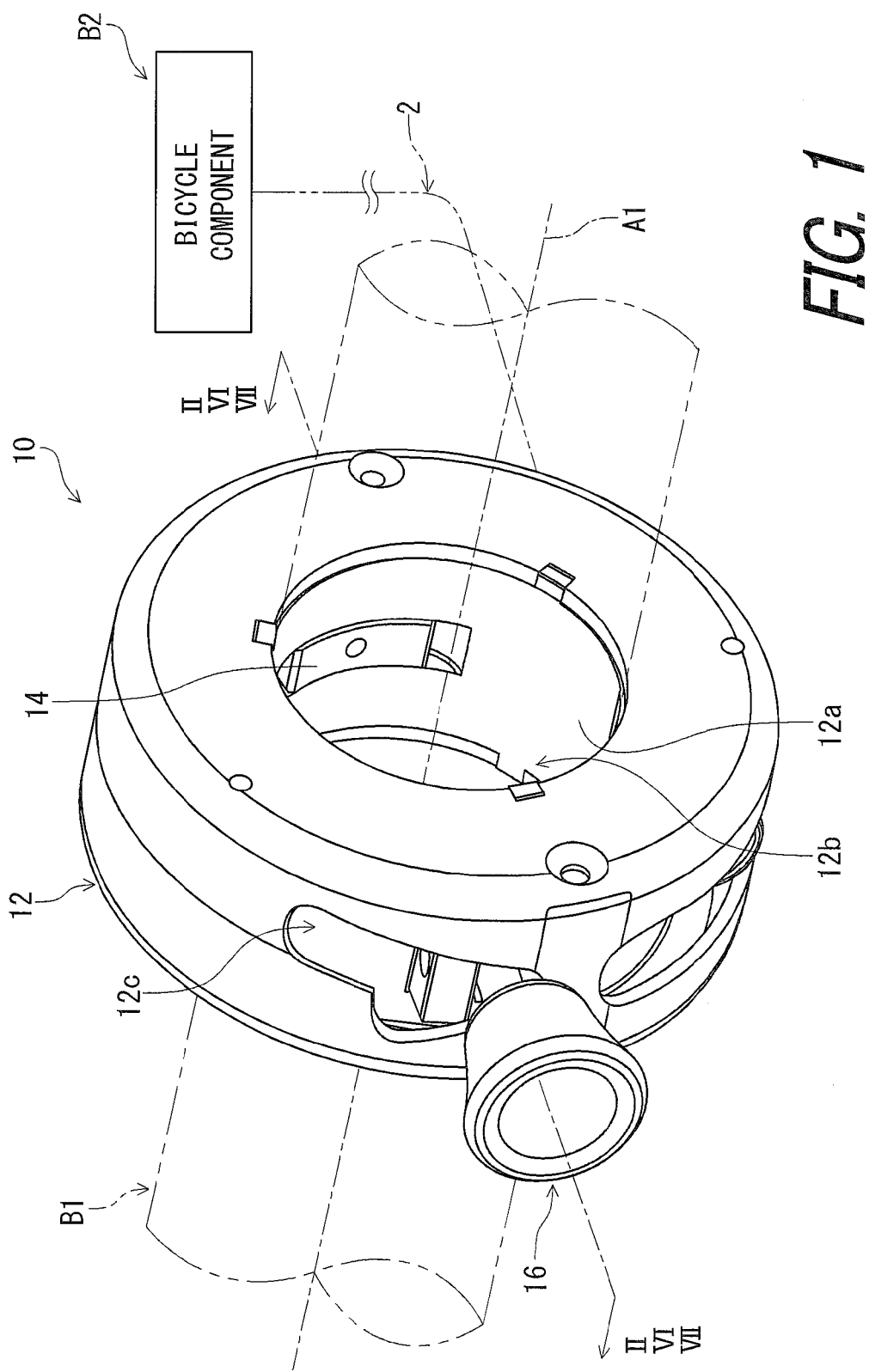
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle part B1. Possible examples of the bicycle part B1 include a bicycle handlebar, a stem and a bicycle frame. The bicycle operating device 10 is configured to operate a bicycle component B2 configured to be operated via an operation cable 2. Possible examples of the bicycle component B2 include a seat post assembly and a bicycle transmission. Since such bicycle components are well known in the bicycle field, they will not be described and/or illustrated in detail here for the sake of brevity. The bicycle operating device 10 is a right hand side control device operated by the rider's right hand. It will be apparent to those skilled in the bicycle field that the configuration of the bicycle operating device 10 can be adapted to a left hand side control device that is operated by the rider's left hand.

In the present application, the following directional terms "forward", "rearward", "left", "right", "upward" and "downward" as well as any other similar directional terms refer to those directions which are determined on the basis of the rider who sits on a bicycle seat (not shown) of a bicycle with facing a bicycle handlebar (not shown). Accordingly, these terms, as utilized to describe the bicycle operating device 10, should be interpreted relative to a bicycle equipped with the bicycle operating device 10 as used in an upright riding position on a horizontal surface.

As seen in FIG. 1, the bicycle operating device 10 comprises a base member 12. The base member 12 is configured to be mounted to the bicycle part B1. In the illustrated embodiment, the base member 12 has an annular shape and includes an inner peripheral surface 12a. The inner peripheral surface 12a defines a center opening 12b through which the bicycle part B1. In the illustrated embodiment, the bicycle part B1 has a longitudinal axis A1. The bicycle operating device 10 comprises a clamp member 14 configured to clamp the bicycle part B1 together with the inner peripheral surface 12a of the base member 12.

As seen in FIG. 1, the bicycle operating device 10 comprises an operated member 16. The operated member 16 is configured to be operated by a user to operate the bicycle component B2 via an operation cable 2. The base member 12 includes a guide opening 12c configured to define a movable area of the operated member 16 with respect to the base member 12. The operated member 16 extends through the guide opening 12c.

Figure 2:
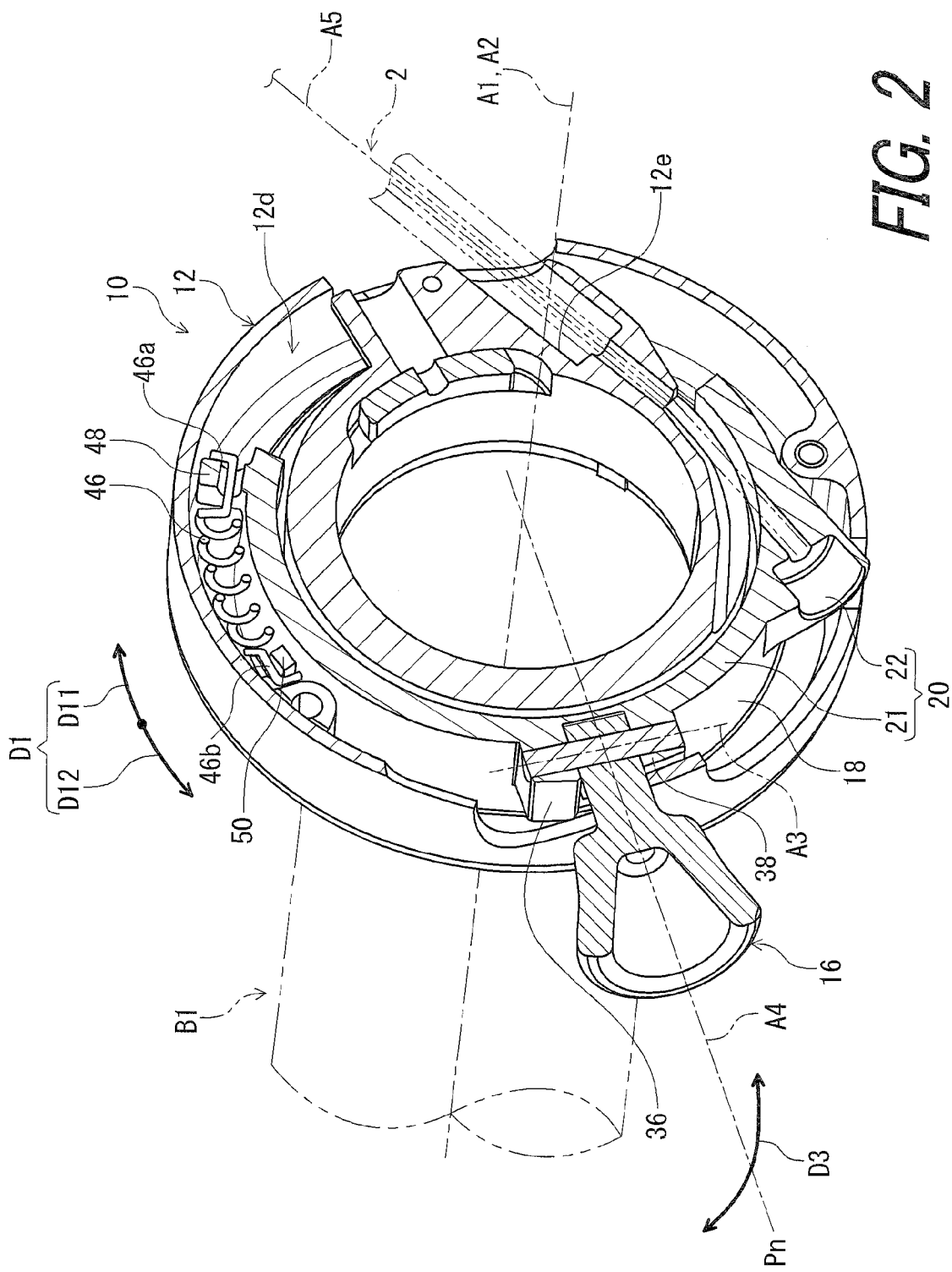
FIG. 2 is a cross-sectional view of the bicycle operating device taken along line II-II of FIG. 1.

As seen in FIG. 2, the bicycle operating device 10 further comprises a cable operating structure 18. The base member 12 includes an inner space 12d having an annular shape. The cable operating structure 18 is provided in the inner space 12d of the base member 12. The cable operating structure 18 is rotatable relative to the base member 12 in a rotational direction D1 about a rotation axis A2. For example, the rotation axis A2 is defined by a center axis of the inner peripheral surface 12a of the base member 12 and is substantially coaxial with the longitudinal axis A1 of the bicycle part B1.

As seen in FIG. 2, the operated member 16 is pivotally coupled to the cable operating structure 18 about a pivot axis A3. The operated member 16 extends along a center axis A4 intersecting with the pivot axis A3. In the illustrated embodiment, the center axis A4 of the operated member 16 is perpendicular to the pivot axis A3. The operated member 16 is rotatable together with the cable operating structure 18 relative to the base member 12 about the rotation axis A2. The pivot axis A3 is defined substantially along the rotational direction D1 of the cable operating structure 18. The pivot axis A3 can be defined to be perpendicular to a radial direction of the inner peripheral surface 12a of the base member 12. The constructions of the operated member 16 and the cable operating structure 18 are not limited to the illustrated embodiment. For example, the operated member 16 can be secured to the cable operating structure 18 if needed and/or desired. Furthermore, the operated member 18 can be slanted in a direction different from the rotational direction D1 together with the cable operating structure 18 with respect to the base member 12 if needed and/or desired.

As seen in FIG. 2, the cable operating structure 18 includes a cable supporting member 20. An end of the operation cable 2 is connected to the cable supporting member 20. More specifically, the cable supporting member 20 includes a cable supporting main-body 21 and a cable attachment portion 22. The cable attachment portion 22 is provided on the cable supporting main-body 21. An end of an inner cable 2a of the operation cable 2 is attached to the cable attachment portion 22. The base member 12 includes a cable guide hole 12e through which the operation cable 2 is to extend. The cable guide hole 12e defines a cable operation axis A5 as a center longitudinal axis thereof.

When the cable operating structure 18 rotates relative to the base member 12 in a first rotational direction D11 of the rotational direction D1, the operation cable 2 (i.e., the inner cable 2a) is pulled from an initial position. When the cable operating structure 18 rotates relative to the base member 12 in a second rotational direction D12 opposite to the first rotational direction D11, the operation cable 2 (i.e., the inner cable 2a) is returned toward the initial position.

Figure 3:
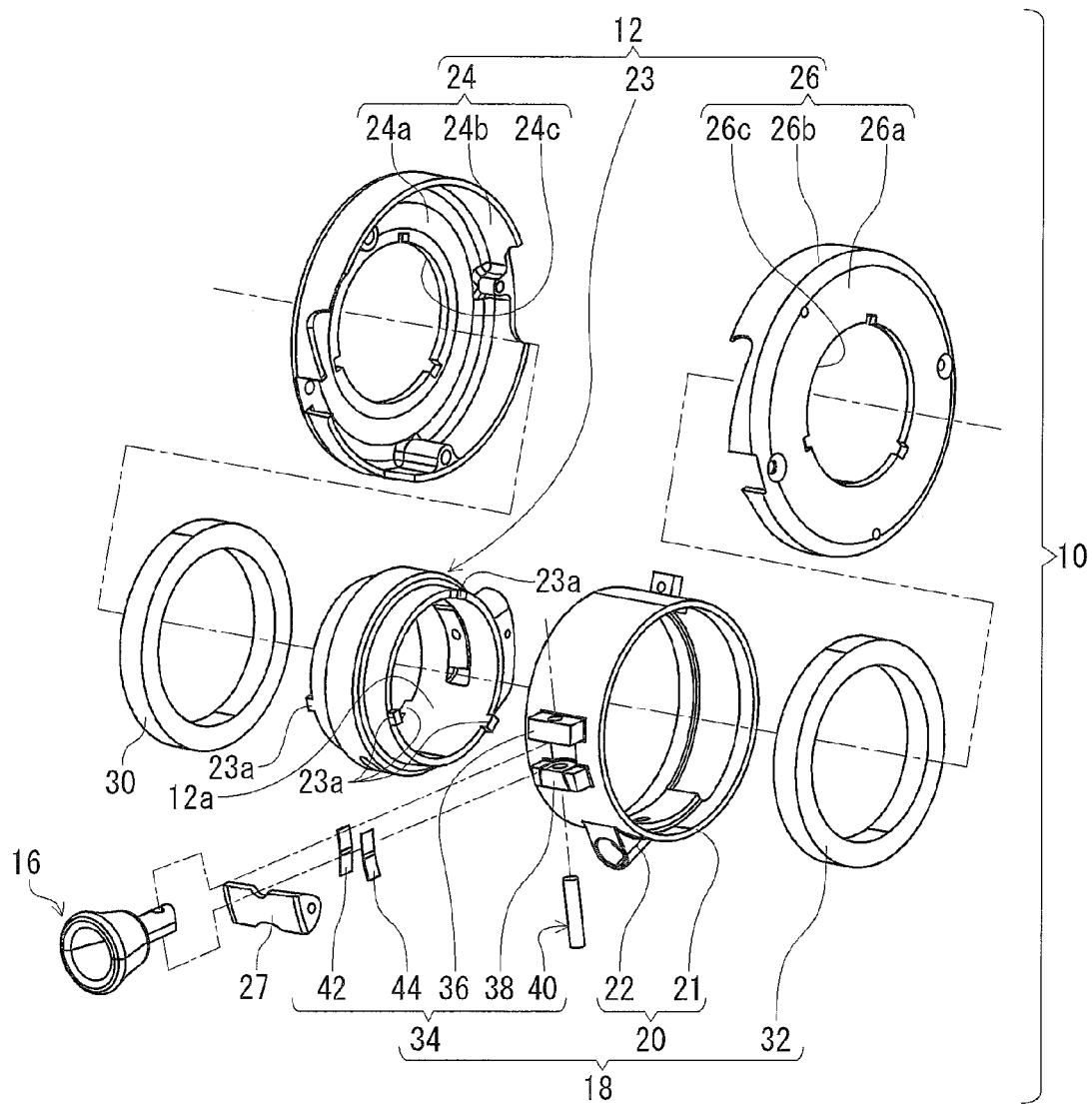
FIG. 3 is an exploded perspective view of the bicycle operating device illustrated in FIG. 1.

As seen in FIG. 3, the base member 12 includes a supporting portion 23 configured to rotatably support the cable supporting member 20 about the rotation axis A2. In the illustrated embodiment, the supporting portion 23 is configured to slidably contact the cable supporting member 20 to rotatably support the cable supporting member 20 about the rotation axis A2. The base member 12 further includes a first housing 24, a second housing 26 and a third housing 27. The second housing 26 is fastened to the first housing 24 by fasteners (not shown) such as a screw. The third housing 27 is fastened to the first housing 24 and the second housing 26 by fasteners (not shown) such as a screw. The first housing 24 has a first annular part 24a and a first cylindrical part 24b. The first annular part 24a has a first opening 24c through which the bicycle part B1 (FIG. 1) is to extend. The first cylindrical part 24b protrudes from an outer periphery of the first annular part 24a. The second annular part 26a has a second annular part 26a and a second cylindrical part 26b. The second housing 26 has a second opening 26c through which the bicycle part B1 is to extend. The second cylindrical part 26b protrudes from an outer periphery of the second annular part 26a. The first cylindrical part 24b, the second cylindrical part 26b and the third housing 27 are assembled to provide the guide opening 12c (FIG. 1).

The supporting portion 23 is provided between the first housing 24 and the second housing 26. The supporting portion 23 is secured to the first annular part 24a and the second annular part 26a via protrusions 23a. The supporting portion 23 defines the center opening 12b of the base member 12. The supporting portion 23, the first housing 24, the second housing 26 and the third housing 27 define the inner space 12d (FIG. 2) of the base member 12.

The cable operating structure 18 includes a first sliding part 30 and a second sliding part 32. The cable supporting main-body 21 has a cylindrical shape and is disposed radially outward of the supporting portion 23. The first sliding part 30 is fitted in the cable supporting member 20. The second sliding part 32 is fitted in the cable supporting member 20. The first sliding part 30 is slidable with an outer peripheral surface of the supporting portion 23. The second sliding part 32 is slidable with an outer peripheral surface of the supporting portion 23. The construction of the cable operating structure 18 is not limited to the illustrated embodiment. For example, at least one of the first sliding part 30 and the second sliding part 32 can be slidably provided in the cable supporting main-body 21 if needed and/or desired. Furthermore, at least one of the first sliding part 30 and the second sliding part 32 can be integrally provided with the cable supporting main-body 21 as a single unitary member if needed and/or desired.

As seen in FIG. 3, the cable operating structure 18 further includes a lever coupling structure 34 configured to pivotally couple the operated member 16 to the cable supporting member 20. The lever coupling structure 34 is provided on an outer peripheral surface of the cable supporting member 20. The lever coupling structure 34 includes a first lever supporting part 36 and a second lever supporting part 38. Each of the first lever supporting part 36 and the second lever supporting part 38 radially outwardly protrudes from the cable supporting main-body 21. The second lever supporting part 38 is spaced apart from the first lever supporting part 36 in the rotational direction D1. The operated member 16 is partially provided between the first lever supporting part 36 and the second lever supporting part 38 (FIG. 2). The lever coupling structure 34 further includes a pivot pin 40 configured to pivotally couple the operated member 16 to the first lever supporting part 36 and the second lever supporting part 38. The pivot pin 40 is attached to the first lever supporting part 36 and the second lever supporting part 38.

Figure 4:
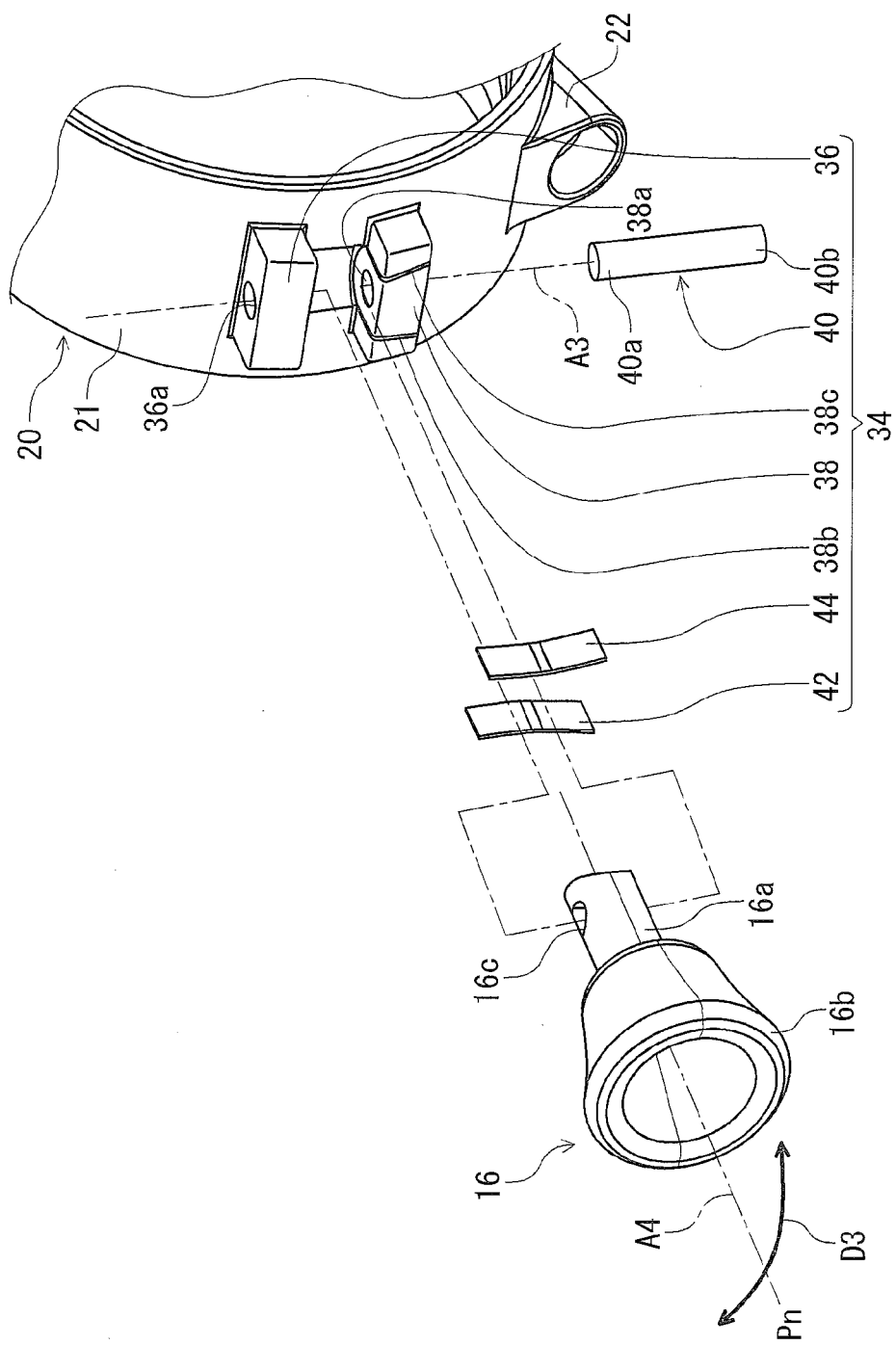
FIG. 4 is a partial exploded perspective view of the bicycle operating device illustrated in FIG. 1.

As seen in FIG. 4, the pivot pin 40 includes a first end 40a and a second end 40b. The first lever supporting part 36 includes a first supporting hole 36a. The second lever supporting part 38 includes a second supporting hole 38a. The first end 40a of the pivot pin 40 is fitted in the first supporting hole 36a. The second end 40b of the pivot pin 40 is fitted in the second supporting hole 38a.

The operated member 16 includes a shaft portion 16a and a head portion 16b provided at an end of the shaft portion 16a. The shaft portion 16a includes a through-hole 16c through which the pivot pin 40 extends. The pivot pin 40 defines the pivot axis A3 of the operated member 16. The head portion 16b has an outer maximum diameter larger than an outer maximum diameter of the shaft portion 16a. The operated member 16 is pivotable relative to the cable supporting member 20 around the pivot axis A3.

As seen in FIG. 4, the lever coupling structure 34 further includes a first biasing element 42 and a second biasing element 44. The first biasing element 42 and the second biasing element 44 are secured to the second lever supporting part 38. In the illustrated embodiment, each of the first biasing element 42 and the second biasing element 44 is a leaf spring, for example. The structures of the first biasing element 42 and the second biasing element 44 are not limited to the illustrated embodiment. For example, the first biasing element 42 and the second biasing element 44 can be other biasing elements such as a coil spring if needed and/or desired. Furthermore, at least one of the first biasing element 42 and the second biasing element 44 can be omitted if needed and/or desired.

The second lever supporting part 38 includes a first slit 38b and a second slit 38c. The first biasing element 42 is partially fitted in the first slit 38b. The second biasing element 44 is partially fitted in the second slit 38c. The shaft portion 16a of the operated member 16 is provided between the first biasing element 42 and the second biasing element 44. The first biasing element 42 and the second biasing element 44 are configured to elastically position the operated member 16 at a neutral position Pn. As seen in FIG. 2, in a state where the operated member 16 is positioned at the neutral position Pn, the center axis A4 of the operated member 16 is substantially perpendicular to the rotation axis A2.

Figure 5:
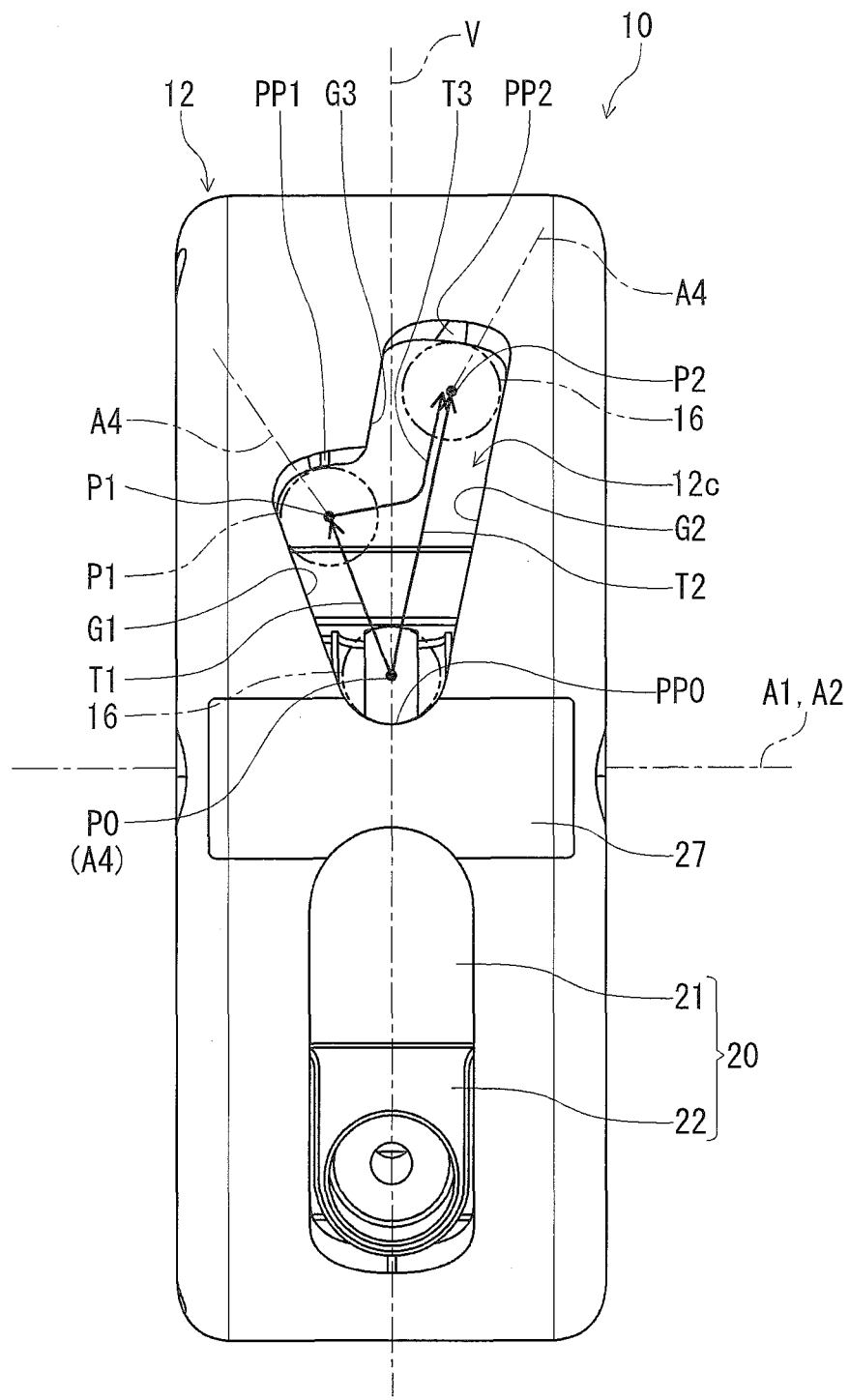
FIG. 5 is an elevational view of the bicycle operating device illustrated in FIG. 1.

As seen in FIG. 5, the operated member 16 is movable within the guide opening 12c of the base member 12. The operated member 16 is omitted from FIG. 5 for convenience of explanation. The operated member 16 is configured to be movable relative to the base member 12 from a rest position P0 to a first operated position P1 along a first path T1. The operated member 16 is configured to be movable relative to the base member 12 from the rest position P0 to a second operated position P2 along a second path T2. In FIG. 5, each of the rest position P0, the first operated position P1 and the second operated position P2 is defined based on the center axis A4 of the operated member 16.

More specifically, the first path T1 is defined so as to at least extend from the center axis A4 of when the operated member 16 is disposed at the rest position P0, to the center axis A4 of when the operated member 16 is disposed at the first operated position P1. The second path T2 is defined so as to at least extend from the center axis A4 of when the operated member 16 is disposed at the rest position P0, to the center axis A4 of when the operated member 16 is disposed at the second operated position P2. The second path T2 is at least partially different from the first path T1. In the illustrated embodiment, the second path T2 is entirely different from the first path T1. The first path T1 is defined as a path having a minimum travel between the rest position P0 and the first operated position P1, for example. The second path T2 is defined as a path having a minimum travel between the rest position P0 and the second operated position P2, for example. The rest position P0 can be defined as a point at which the first path T1 and the second path T2 intersects with each other. In the illustrated embodiment, the second path T2 is defined on a plane which is not parallel to a plane on which the first path T1 is defined.

In the present application, the term "rest position" as used herein refers to a position at which a movable part (e.g., the operated member 16) remains stationary in a state where the movable part is not operated by a user (e.g., a rider). The term "operated position" as used herein refers to a position at which the movable part has been operated by a user (e.g., a rider) to perform the operation of the bicycle component B2.

As seen in FIG. 5, the rest position P0 is provided on a virtual plane V perpendicular to the rotation axis A2. At least one of the first operated position P1 and the second operated position P2 is spaced apart from the virtual plane V. In the illustrated embodiment, each of the first operated position P1 and the second operated position P2 is spaced apart from the virtual plane V. The first operated position P1 is disposed on an opposite side of the second operated position P2 with respect to the virtual plane V. However, one of the first operated position P1 and the second operated position P2 can be disposed on the virtual plane V if needed and/or desired. Furthermore, both of the first operated position P1 and the second operated position P2 can be disposed on the same side with respect to the virtual plane V if needed and/or desired.

As seen in FIG. 5, the base member 12 includes a rest positioning portion PP0, a first positioning portion PP1 and a second positioning portion PP2. The rest positioning portion PP0 is configured to be contactable with the operated member 16 to position the operated member 16 at the rest position P0 relative to the base member 12. The first positioning portion PP1 is configured to be contactable with the operated member 16 to position the operated member 16 at the first operated position P1 relative to the base member 12. The second positioning portion PP2 is configured to be contactable with the operated member 16 to position the operated member 16 at the second operated position P2 relative to the base member 12.

The base member 12 includes a first guide portion G1 and a second guide portion G2. The first guide portion G1 is configured to guide the operated member 16 between the rest positioning portion PP0 and the first positioning portion PP1. The second guide portion G2 is configured to guide the operated member 16 between the rest positioning portion PP0 and the second positioning portion PP2. The first guide portion G1 is configured to allow the operated member 16 to be moved from the first operated position P1 to the second operated position P2 without via the rest position P0. More specifically, the operated member 16 is configured to be movable relative to the base member 12 from the first operated position P1 to the second operated position P2 along a third path T3. The third path T3 is partially the same as the second path T2.

The second guide portion G2 is on an opposite side of the first guide portion G1 in the guide opening 12c. The operated member 16 is movable relative to the base member 12 between the first guide portion G1 and the second guide portion G2. The base member 12 further includes a third guide portion G3 configured to guide the operated member 16 between the first operated position P1 and the second operated position P2. The third guide portion G3 is configured to allow the operated member 16 to be mover from the second operated position P2 to the first operated position P1 without via the rest position P0. The rest positioning portion PP0, the first positioning portion PP1, the second positioning portion PP2, the first guide portion G1, the second guide portion G2 and the third guide portion G3 define the guide opening 12c of the base member 12.

Figure 6:
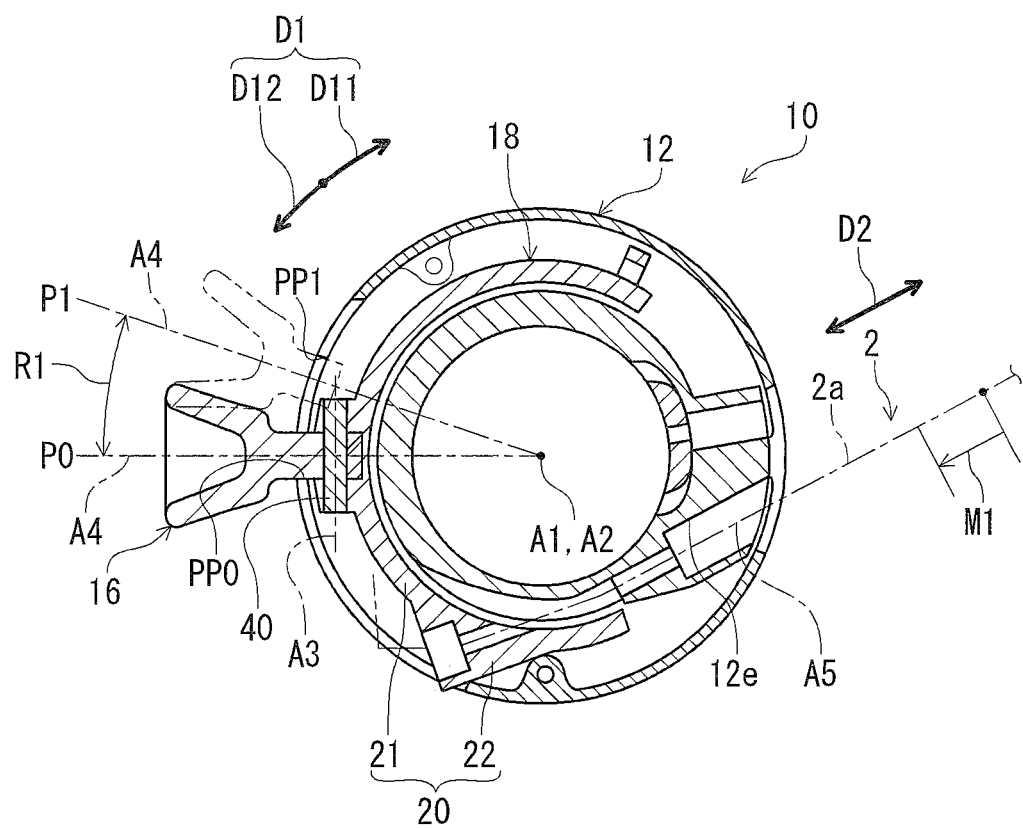
FIG. 6 is a schematic cross-sectional view of the bicycle operating device taken along line VI-VI of FIG. 1 (a first operated position)

As seen in FIGS. 5 and 6, the operated member 16 is configured to be movable relative to the base member 12 from the rest position P0 to the first operated position P1 along the first path T1 such that the operation cable 2 is pulled relative to the base member 12 by a first amount of movement M1 in a cable operating direction D2. The cable operating structure 18 is configured to pull the operation cable 2 relative to the base member 12 in the cable operating direction D2 by the first amount of movement M1 when the operated member 16 is moved from the rest position P0 to the first operated position P1 along the first path T1. The cable operating direction D2 is defined as a direction parallel to the cable operation axis A5 of the cable guide hole 12e, for example.

Figure 7:
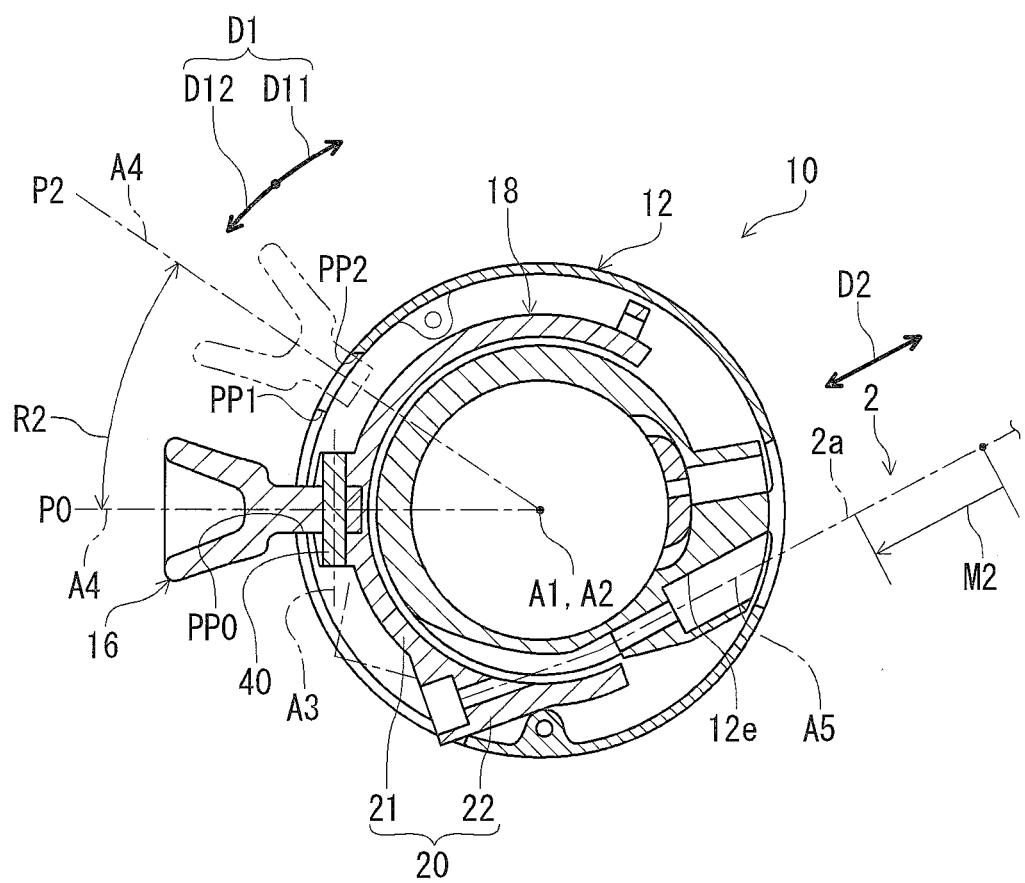
FIG. 7 is a schematic cross-sectional view of the bicycle operating device taken along line VII-VII of FIG. 1 (a second operated position)

As seen in FIGS. 5 and 7, the operated member 16 is configured to be movable relative to the base member 12 from the rest position P0 to the second operated position P2 along the second path T2 such that the operation cable 2 is pulled relative to the base member 12 by a second amount of movement M2 in the cable operating direction D2. The cable operating structure 18 is configured to pull the operation cable 2 relative to the base member 12 in the cable operating direction D2 by the second amount of movement M2 when the operated member 16 is moved from the rest position P0 to the second operated position P2 along the second path T2.

As seen in FIGS. 6 and 7, the second amount of movement M2 is different from the first amount of movement M1. In the illustrated embodiment, the second amount of movement M2 is greater than the first amount of movement M1. However, the second amount of movement M2 can be less than the first amount of movement M1 if needed and/or desired.

As seen in FIG. 6, the first positioning portion PP1 and the rest positioning portion PP0 are configured to define a first rotation angle R1 of the cable operating structure 18 relative to the base member 12 about the rotation axis A2. The first positioning portion PP1 and the rest positioning portion PP0 are configured to define the first amount of movement M1 of the operation cable 2 in the cable operating direction D2.

As seen in FIG. 7, the second positioning portion PP2 and the rest positioning portion PP0 are configured to define a second rotation angle R2 of the cable operating structure 18 relative to the base member 12 about the rotation axis A2. The second rotation angle R2 is greater than the first rotation angle R1. The second positioning portion PP2 and the rest positioning portion PP0 are configured to define the second amount of movement M2 of the operation cable 2 in the cable operating direction D2.

As seen in FIGS. 5 and 6, the cable operating structure 18 is configured to be moved by the operated member 16 in a first direction when the operated member 16 is moved from the rest position P0 to the first operated position P1. In the illustrated embodiment, the first direction is defined as the first rotational direction D11 of the rotational direction D1. The first direction can be defined as directions other than the first rotational direction D11. The first rotational direction D11 is hereinafter referred to as the first direction D11. The cable supporting member 20 is configured to be rotatable relative to the base member 12 about the rotation axis A2 in the first direction D11. In other words, the cable supporting member 20 is configured to be rotatable relative to the base member 12 around the longitudinal axis A1 of the bicycle part B1.

As seen in FIGS. 5 and 6, the cable operating structure 18 is configured to be moved by the operated member 16 in the first direction D11 when the operated member 16 is moved from the rest position P0 to the second operated position P2. The cable supporting member 20 is configured to be movable relative to the base member 12 in the first direction D11 to pull the operation cable 2 in the cable operating direction D2.

Figure 8:
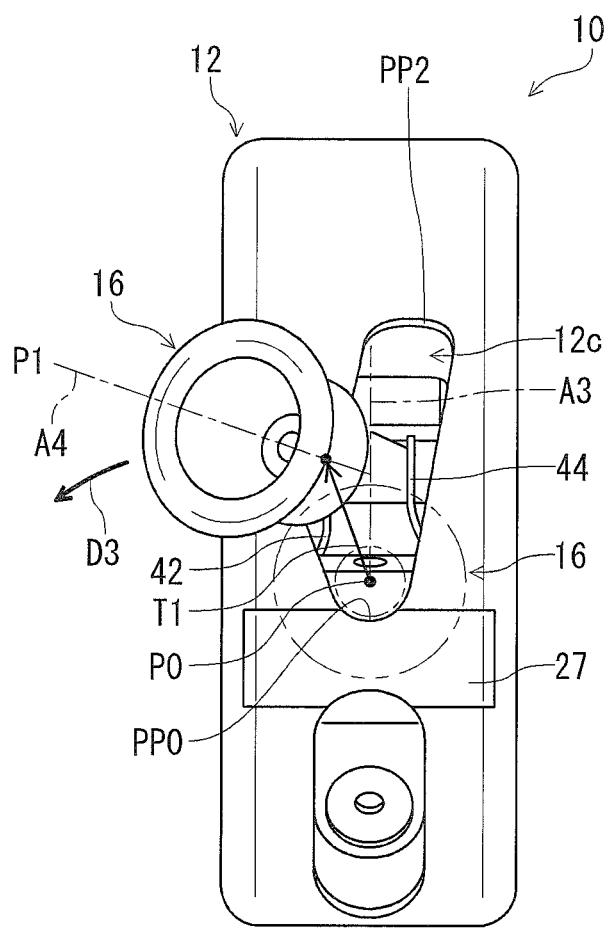
FIG. 8 is an elevational view of the bicycle operating device illustrated in FIG. 1 (the first operated position)
Figure 9:
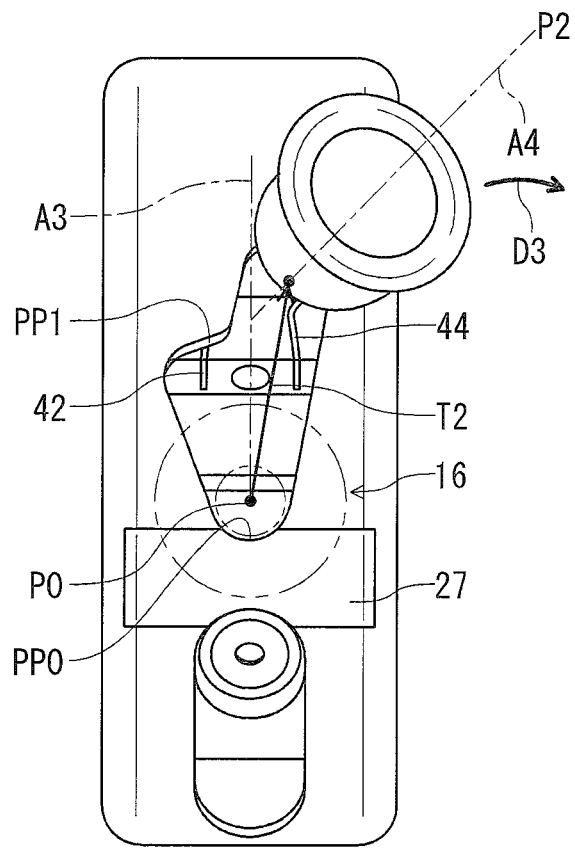
FIG. 9 is an elevational view of the bicycle operating device illustrated in FIG. 1 (the second operated position)

As seen in FIGS. 8 and 9, the operated member 16 is configured to be slanted by a user in a second direction D3 different from the first direction D11 when the operated member 16 is moved from the rest position P0 to at least one of the first operated position P1 and the second operated position P2. In the illustrated embodiment, the operated member 16 is configured to be slanted by a user in the second direction D3 when the operated member 16 is moved from the rest position P0 to each of the first operated position P1 and the second operated position P2.

As seen in FIGS. 2, 8 and 9, the second direction D3 is defined as a pivot direction in which the operated member 16 is pivotable relative to the cable operating structure 18 around the pivot axis A3. The operated member 16 is pivotally coupled to the cable supporting member 20 about the pivot axis A3 such that the operated member 16 is configured to be slanted in the second direction D3.

Returning to FIG. 2, the bicycle operating device 10 further comprises a first biasing member 46 configured to bias the cable supporting member 20 such that the operated member 16 is disposed at the rest position P0. In the illustrated embodiment, the first biasing member 46 is a tension coil spring. However, the first biasing member 46 can be a biasing member other than the tension coil spring if needed and/or desired.

The cable operating structure 18 includes a first spring support 48 radially outwardly protruding from the cable supporting main-body 21. The base member 12 includes a second spring support 50 spaced apart from the first spring support 48 in the rotational direction D1. A first end portion 46a of the first biasing member 46 is hooked to the first spring support 48. A second end portion 46b of the first biasing member 46 is hooked to the second spring support 50.

As seen in FIG. 2, the first biasing member 46 is configured to bias the cable operating structure 18 to rotate relative to the base member 12 in the second rotational direction D12. As seen in FIG. 5, the operated member 16 is pressed against the rest positioning portion PP0 in a state where the cable operating structure 18 is biased to rotate relative to the base member 12 in the second rotational direction D12. This causes the operated member 16 to be positioned at the rest position P0. However, the first biasing member 46 can be omitted from the bicycle operating device 10 if needed and/or desired. The first biasing member 46 can be provided in a bicycle component operated using the bicycle operating device 10 if needed and/or desired.

The bicycle operating device 10 can be used to operate several bicycle components. One example of the bicycle component B2 will be described below referring to FIGS. 10 to 17.

Figure 10:
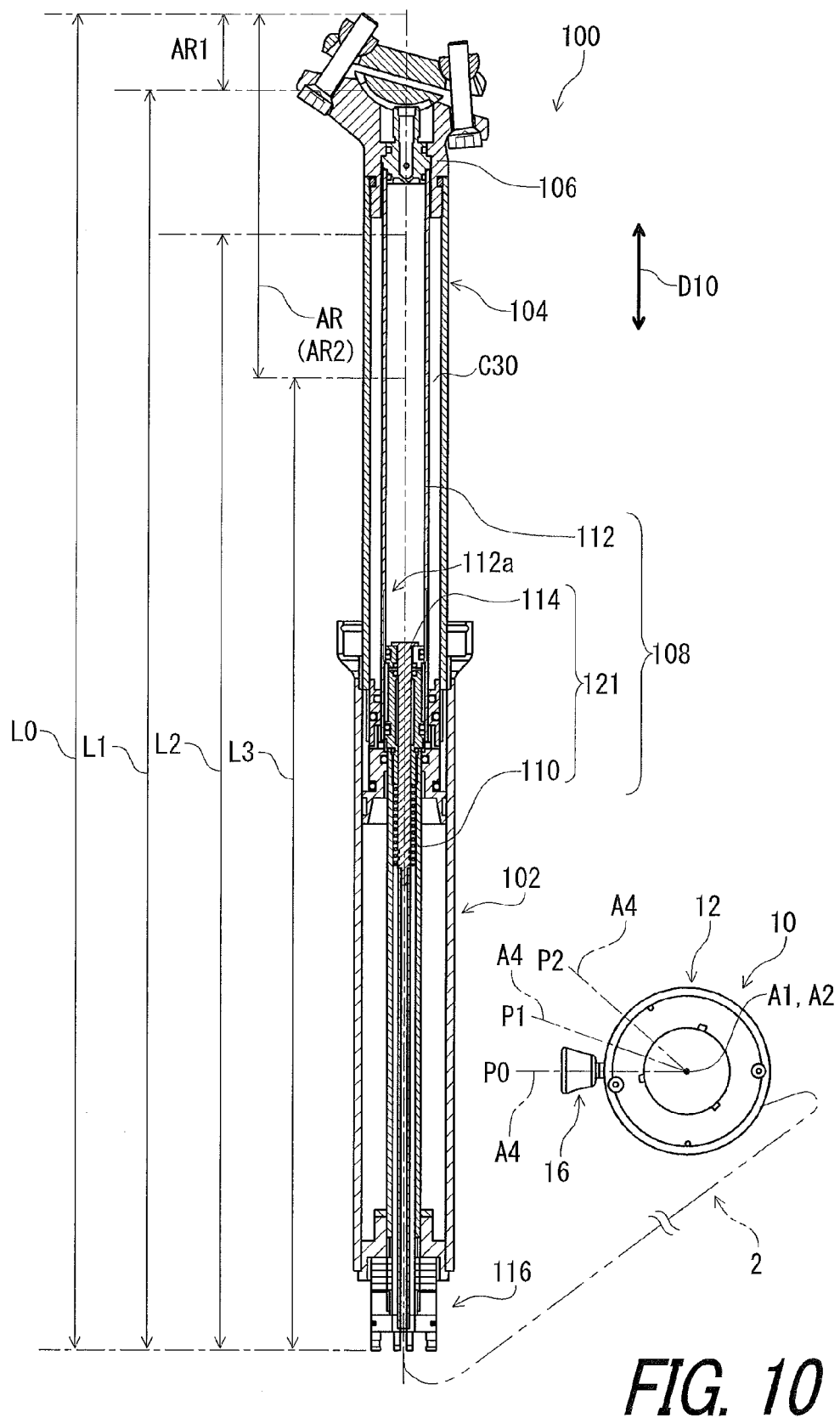
FIG. 10 is a cross-sectional view of a bicycle seatpost assembly in accordance with the first embodiment.

As seen in FIG. 10, the bicycle operating device 10 can be used to operate a bicycle seatpost assembly 100 via the operation cable 2, for example. The operation cable 2 is configured to be connected to the bicycle seatpost assembly 100 to adjust an overall length of the bicycle seatpost assembly 100. The bicycle seatpost assembly 100 in accordance with the first embodiment has a maximum overall length L0 and a minimum overall length L3. The overall length of the bicycle seatpost assembly 100 is adjustable within an adjustable range AR defined as a difference between the maximum overall length L0 and the minimum overall length L3. The bicycle seatpost assembly 100 has a first overall length L1 and a second overall length L2. The first overall length L1 and the second overall length L2 are defined between the maximum overall length L0 and the minimum overall length L3. The first and second overall lengths L1 and L2 are different from each other.

For example, the overall length of the bicycle seatpost assembly 100 is adjustable to the first overall length L1 in a state where the operated member 16 is positioned at the first operated position P1 such that the operation cable 2 is pulled relative to the base member 12 by the first amount of movement M1 (FIG. 6). The overall length of the bicycle seatpost assembly 100 is adjustable to the second overall length L2 in a state where the operated member 16 is positioned at the second operated position P2 such that the operation cable 2 is pulled relative to the base member 12 by the second amount of movement M2 (FIG. 7).

As seen in FIG. 10, the bicycle seatpost assembly 100 comprises a first cylinder 102 and a second cylinder 104. The first cylinder 102 is detachably attached to a seat tube (not shown), for example. However, the second cylinder 104 can be detachably attached to the seat tube if needed and/or desired. The second cylinder 104 is configured to be telescopically received in the first cylinder 102. The first cylinder 102 and the second cylinder 104 are configured to be movable relative to each other in a telescopic direction D10. The second cylinder 104 includes a seat attachment portion 106 to which a bicycle seat (not shown) is to be attached.

In the illustrated embodiment, the bicycle seatpost assembly 100 has a locked state, a first adjustable state and a second adjustable state. The bicycle seatpost assembly 100 has a structure configured to switch a state of the bicycle seatpost assembly 100 among the locked state, the first adjustable state and the second adjustable state using the bicycle operating device 10.

For example, in the locked state, the overall length of the bicycle seatpost assembly 100 is maintained at an adjusted overall length. In the locked state, the first cylinder 102 and the second cylinder 104 are fixedly positioned relative to each other in the telescopic direction D10.

In the first adjustable state, the overall length of the bicycle seatpost assembly 100 is adjustable to the first overall length L1 by just operating the operated member 16 of the bicycle operating device 10 to the first operated position P1. More specifically, in the first adjustable state, the second cylinder 104 stops relative to the first cylinder 102 at a position corresponding to the first overall length L1 when the second cylinder 104 downwardly moves relative to the first cylinder 102 from a position corresponding to the maximum overall length L0. In the first adjustable state, the first cylinder 102 and the second cylinder 104 are telescopically movable relative to each other between the maximum overall length L0 and the first overall length L1 in the telescopic direction D10.

Furthermore, in the first adjustable state, the overall length of the bicycle seatpost assembly 100 is continuously adjustable between the maximum overall length L0 and the first overall length L1 by operating the operated member 16 of the bicycle operating device 10 to the first operated position P1. In the second adjustable state, the first cylinder 102 and the second cylinder 104 are telescopically movable relative to each other between the maximum overall length L0 and the minimum overall length L3 in the telescopic direction D10. Namely, in the first adjustable state, a positional relationship between the first cylinder 102 and the second cylinder 104 is continuously adjustable within a first adjustable position range AR1. The first adjustable position range AR1 is defined between a first maximum overall length (the maximum overall length L0) and a first minimum overall length (first overall length L1) of the bicycle seatpost assembly 100.

In the second adjustable state, the overall length of the bicycle seatpost assembly 100 is continuously adjustable within the adjustable range AR by operating the operated member 16 to the second operated position P2. Namely, in the second adjustable state, the positional relationship between the first cylinder 102 and the second cylinder 104 is continuously adjustable within a second adjustable position range AR2 (the adjustable range AR) different from the first adjustable position range AR1. The second adjustable position range AR2 is defined between a second maximum overall length (the maximum overall length L0) and a second minimum overall length (the minimum overall length L3) of the bicycle seatpost assembly 100. In the illustrated embodiment, the second overall length L2 shows possible overall lengths within the adjustable range AR while the first overall length L1 is a predetermined overall length.

As seen in FIG. 10, the first adjustable position range AR1 and the second adjustable position range AR2 are different from each other. More specifically, the first adjustable position range AR1 at least partially overlaps with the second adjustable position range AR2. In the illustrated embodiment, the first adjustable position range AR1 entirely overlaps with the second adjustable position range AR2 and is included in the second adjustable position range AR2. The second adjustable position range AR2 partially overlaps with the first adjustable position range AR1.

The first adjustable position range AR1 has a total length different from a total length of the second adjustable position range AR2. In the illustrated embodiment, the total length of the first adjustable position range AR1 is shorter than the total length of the second adjustable position range AR2. The first minimum overall length (first overall length L1) is different from the second minimum overall length (the minimum overall length L3). On the other hand, the first maximum overall length (the maximum overall length L0) is equal to the second maximum overall length (the maximum overall length L0). In the illustrated embodiment, the first minimum overall length (first overall length L1) is longer than the second minimum overall length (the minimum overall length L3).

As seen in FIG. 10, the bicycle seatpost assembly 100 comprises a positioning structure 108. The positioning structure 108 is configured to relatively position the first cylinder 102 and the second cylinder 104. The positioning structure 108 is configured to switch a state of the bicycle seatpost assembly 100 among the locked state, the first adjustable state and the second adjustable state.

The positioning structure 108 is configured to switch the state of the bicycle seat post assembly 100 among the first adjustable state and the second adjustable state in response to an operation of the bicycle operating device 10 (FIG. 5). The positioning structure 108 is configured to switch the state of the bicycle seatpost assembly 100 to the first adjustable state in response to a first operation of the bicycle operating device 10. The positioning structure 108 is configured to switch the state of the bicycle seatpost assembly 100 to the second adjustable state in response to a second operation of the bicycle operating device 10.

In the illustrated embodiment, as seen in FIG. 5, the first operation of the bicycle operating device 10 is an operation in which the operated member 16 is moved relative to the base member 12 from the rest position P0 to the first operated position P1 along the first path T1. The second operation of the bicycle operating device 10 is an operation in which the operated member 16 is moved relative to the base member 12 from the rest position P0 to the second operated position P2 along the second path T2.

In the bicycle operating device 10, at least one of a movement amount and a movement direction of the first operation is different from at least one of a movement amount and a movement direction of the second operation. In the illustrated embodiment, as seen in FIG. 5, the movement amount of the first operation is different from the movement amount of the second operation in the bicycle operating device 10. Furthermore, the movement direction of the first operation is different from the movement direction of the second operation in the bicycle operating device 10. As seen in FIG. 10, the first operation of the bicycle operating device 10 is transmitted from the bicycle operating device 10 to the bicycle seatpost assembly 100 via the operation cable 2. The second operation of the bicycle operating device 10 is transmitted from the bicycle operating device 10 to the bicycle seatpost assembly 100 via the operation cable 2.

As seen in FIG. 5, the movement amount and the movement direction of the first operation (e.g., the first path T1) are different from the movement amount and the movement direction of the second operation (e.g., the second path T2) in the bicycle operating device 10, respectively. However, one of the movement amount and the movement direction of the first operation can be different from that of the second operation in the bicycle operating device 10. In a case where the movement direction of the first operation is different from the movement direction of the second operation, the movement directions of the first operation and the second operation can be defined on the same virtual plane and can be defined on the same virtual line so as to be opposite to each other.

Figure 11:
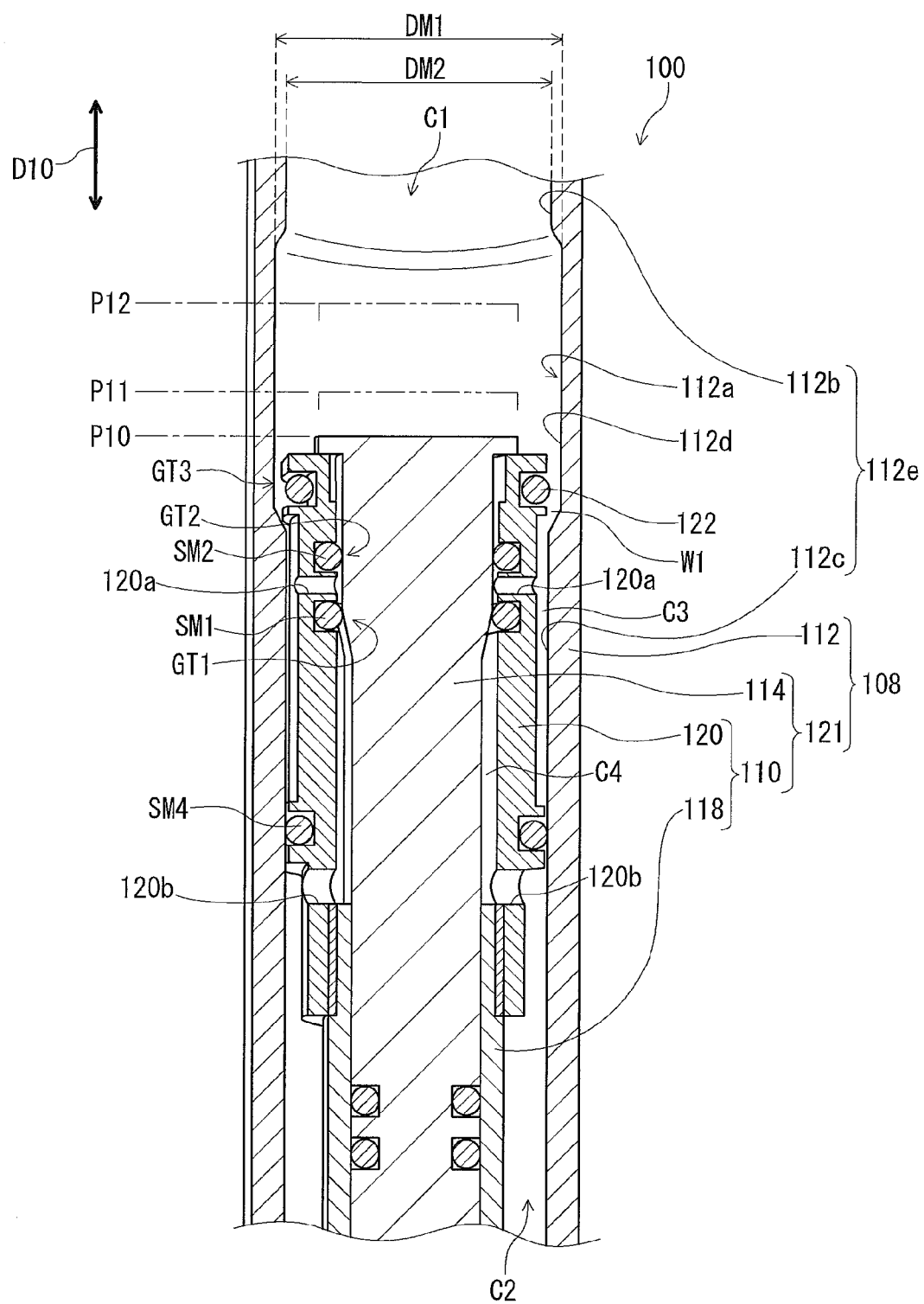
FIG. 11 is a partial cross-sectional view of the bicycle seatpost assembly illustrated in FIG. 10 (a closed position)

As seen in FIG. 10, the positioning structure 108 includes a support member 110 and a fluid cylinder 112. The support member 110 is configured to be telescopically movable relative to the fluid cylinder 112. The support member 110 and the fluid cylinder 112 extend in the telescopic direction D10. The support member 110 is provided in the first cylinder 102 and is integrally movable with the first cylinder 102 relative to the second cylinder 104. The fluid cylinder 112 is provided in the second cylinder 104 and is integrally movable with the second cylinder 104 relative to the first cylinder 102. However, the support member 110 can be provided in the second cylinder 104 and the fluid cylinder 112 can be provided in the first cylinder 102 if needed and/or desired As seen in FIG. 11, the positioning structure 108 includes a movable member 114. The movable member 114 is configured to be movable relative to the support member 110. As seen in FIG. 10, the bicycle seatpost assembly 100 further includes a valve operating structure 116 attached to a lower end of the first cylinder 102. The valve operating structure 116 is operatively connected to the bicycle operating device 10 via the operation cable 2. The movable member 114 is upwardly moved relative to the support member 110 via the valve operating structure 116. In the illustrated embodiment, the movable member 114 is upwardly moved relative to the support member 110 via the valve operating structure 116 in response to the first operation and the second operation of the bicycle operating device 10 (FIG. 10).

As seen in FIG. 11, the support member 110 includes an inner tube 118 and a valve receiving member 120. The valve receiving member 120 is secured to an upper end of the inner tube 118 and is slidably provided in the fluid cylinder 112. The positioning structure 108 is configured to change a position of the movable member 114 relative to the support member 110 in response to an operation of the bicycle operating device 10 (FIG. 10).

As seen in FIG. 11, the positioning structure 108 includes a first chamber C1 and a second chamber C2. The first chamber C1 is defined by the support member 110 (the valve receiving member 120), the fluid cylinder 112 and the movable member 114. The second chamber C2 is defined by the support member 110 and the fluid cylinder 112. Each of the first chamber C1 and the second chamber C2 is filled with a substantially incompressible fluid (e.g., oil), for example.

Figure 13:
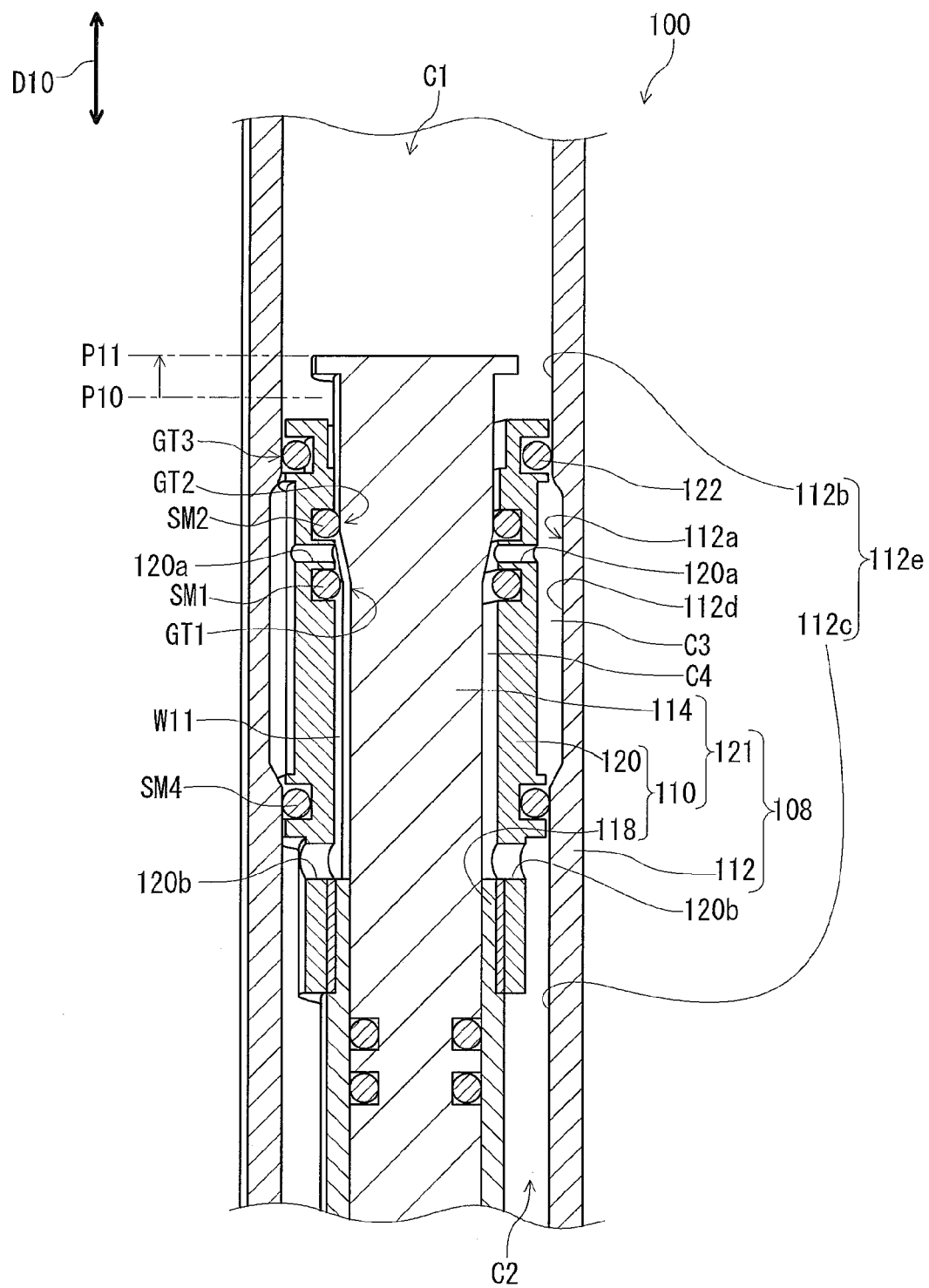
FIG. 13 is a partial cross-sectional view of the bicycle seatpost assembly illustrated in FIG. 10 (the first open position)
Figure 14:
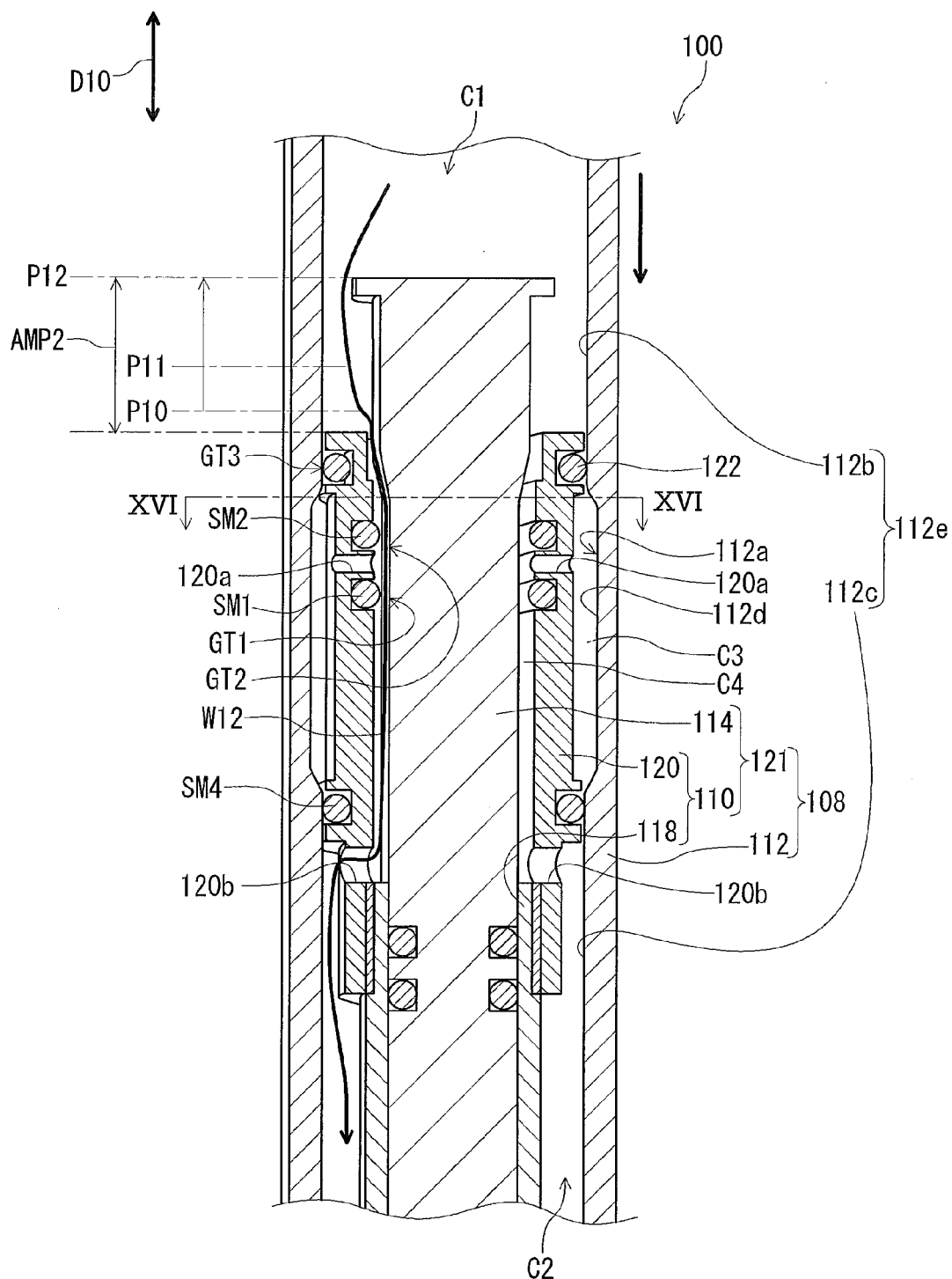
FIG. 14 is a partial cross-sectional view of the bicycle seatpost assembly illustrated in FIG. 10 (a second open position)

The support member 110 and the movable member 114 constitute a valve structure 121. The valve structure 121 has a closed state (FIG. 11), a first open state (FIGS. 12 and 13) and a second open state (FIG. 14). The closed state corresponds to the locked state of the bicycle seatpost assembly 100. The first open state corresponds to the first adjustable state of the bicycle seatpost assembly 100. The second open state corresponds to the second adjustable state of the bicycle seatpost assembly 100.

As seen in FIG. 11, the movable member 114 is slidably provided in the inner tube 118 and the valve receiving member 120. The movable member 114 is configured to be positioned at a closed position P10, a first open position P11 and a second open position P12. In the closed state of the valve structure 121, the movable member 114 is positioned at the closed position P10. In the first open state of the valve structure 121, the movable member 114 is positioned at the first open position P11. In the second open state of the valve structure 121, the movable member 114 is positioned at the second open position P12. The positioning structure 108 includes a biasing element (not shown) configured to bias the movable member 114 relative to the support member 110 toward the closed position P10.

The movable member 114 contacts the valve receiving member 120 to close the valve structure 121 in a state where the movable member 114 is positioned at the closed position P10. The closed position P10 corresponds to the rest position P0 (FIGS. 5 and 10) of the bicycle operating device 10. The first open position P11 corresponds to the first operated position P1 (FIGS. 5, 6 and 10) of the bicycle operating device 10. The second open position P12 corresponds to the second operated position P2 (FIGS. 5, 7 and 10) of the bicycle operating device 10. The position of the movable member 114 is continuously adjustable relative to the support member 110 between the closed position P10 and the second open position P12 using the bicycle operating device 10 (FIG. 10). The position of the movable member 114 can be adjusted at the first open position P11 relative to the support member 110 using the first operated position P1 of the bicycle operating device 10 (FIG. 10).

Figure 12:
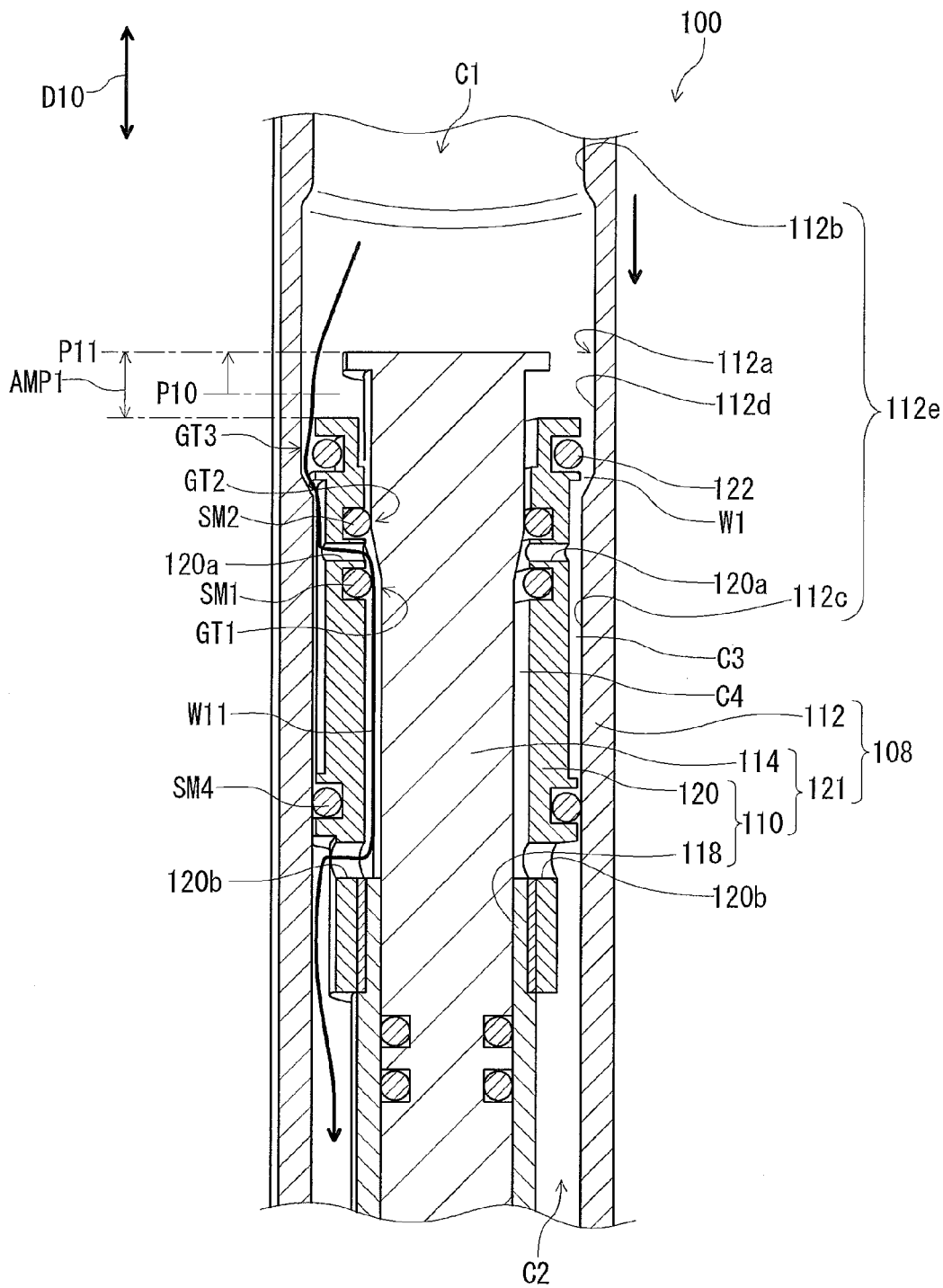
FIG. 12 is a partial cross-sectional view of the bicycle seatpost assembly illustrated in FIG. 10 (a first open position)

As seen in FIGS. 12 and 14, the movable member 114 is movably mounted to the support member 110 and is configured to protrude from the support member 110. As seen in FIG. 12, the movable member 114 protrudes from the support member 110 by a first amount of protrusion AMP1 in a state where the movable member 114 is disposed at the first open position P11. As seen in FIG. 14, the movable member 114 protrudes from the support member 110 by a second amount of protrusion AMP2 different from the first amount of protrusion AMP1 in a state where the movable member 114 is disposed at the second open position P12. In the illustrated embodiment, as seen in FIGS. 12 and 14, the second amount of protrusion AMP2 is greater than the first amount of protrusion AMP1.

As seen in FIGS. 12 and 14, the positioning structure 108 includes a first passageway W11 and a second passageway W12. As seen in FIG. 12, the first chamber C1 is in communication with the second chamber C2 via the first passageway W11 in the first adjustable state of the bicycle seatpost assembly (i.e., in a state where the movable member 114 is disposed at the first open position P11). As seen in FIG. 14, the first chamber C1 is in communication with the second chamber C2 via the second passageway W12 in the second adjustable state of the bicycle seatpost assembly (i.e., in a state where the movable member 114 is disposed at the second open position P12). As seen in FIGS. 12 and 14, the first passageway W11 and the second passageway W12 are at least partially disposed between the support member 110 and the movable member 114. In the illustrated embodiment, the first passageway W11 is at least partially different from the second passageway W12.

As seen in FIGS. 12 and 14, the positioning structure 108 is configured to switch a fluid passageway among the first passageway W11 and the second passageway W12 to switch the state of the bicycle seatpost assembly among the first adjustable state and the second adjustable state. In the illustrated embodiment, the movable member 114 is configured to switch the fluid passageway among the first passageway W11 and the second passageway W12 in accordance with the position of the movable member 114 relative to the support member 110.

As seen in FIG. 12, the first passageway W11 includes a first gate GT1 configured to open and close in response to the position of the movable member 114 relative to the support member 110. The first gate GT1 is open in a state where the movable member 114 is disposed at the first open position P11.

More specifically, the positioning structure 108 includes a first-gate seal member SM1 provided on an inner periphery of the valve receiving member 120. The first-gate seal member SM1 is contactable with the movable member 114. The first gate GT1 is closed in a state where the first-gate seal member SM1 contacts the movable member 114 (FIG. 11). The first gate GT1 is open in a state where the first-gate seal member SM1 is spaced apart from the movable member 114 (FIG. 12).

As seen in FIG. 14, the second passageway W12 includes a second gate GT2 configured to open and close in response to a position of the movable member 114 relative to the support member 110. The second gate GT2 is provided at a position different from a position of the first gate GT1. Specifically, the second gate GT2 is provided at a position spaced apart from the first gate GT1 in the telescopic direction D10 and is closer to an upper end of the movable member than the first gate GT1. The first gate GT1 and the second gate GT2 are open in a state where the movable member 114 is disposed at the second open position P12 different from the first open position P11 relative to the support member 110.

More specifically, the positioning structure 108 includes a second-gate seal member SM2 provided on the inner periphery of the valve receiving member 120. The second-gate seal member SM2 is contactable with the movable member 114. The second gate GT2 is closed in a state where the second-gate seal member SM2 contacts the movable member 114 (FIG. 11). The second gate GT2 is open in a state where the second-gate seal member SM2 is spaced apart from the movable member 114 (FIG. 14).

As seen in FIG. 11, the first gate GT1 and the second gate GT2 are closed in a state where the movable member 114 is disposed at the closed position P10 different from the first open position P11 and the second open position P12 relative to the support member 110. In this state, the first-gate seal member SM1 and the second-gate seal member SM2 contact the movable member 114 so that the first gate GT1 and the second gate GT2 are closed. As seen in FIG. 12, the second gate GT2 is closed in a state where the movable member 114 is disposed at the first open position P11. In this state, the first-gate seal member SM1 is spaced apart from the movable member 114 so that the first gate GT1 is open, and the second-gate seal member SM2 contacts the movable member 114 so that the second gate GT2 is closed.

A first intermediate chamber C3 is defined between the fluid cylinder 112 and the valve receiving member 120. More specifically, the positioning structure 108 includes an additional seal member SM4 provided on the outer periphery of the valve receiving member 120. The first intermediate chamber C3 is defined by the fluid cylinder 112, the valve receiving member 120 and the additional seal member SM4.

A second intermediate chamber C4 is defined between the movable member 114 and the valve receiving member 120. The valve receiving member 120 includes first through-holes 120a and second through-holes 120b. The first through-holes 120a extends in a radial direction of the valve receiving member 120 and are provided between the first-gate seal member SM1 and the second-gate seal member SM2.

As seen in FIG. 12, the first intermediate chamber C3 is in communication with the second intermediate chamber C4 via the first through-holes 120a in a state where the first gate GT1 is open. The second through-holes 120b extends in the radial direction of the valve receiving member 120 and are provided on an opposite side of the first through-holes 120a relative to the first-gate seal member SM1. The second intermediate chamber C4 is in communication with the second chamber C2 via the second through-holes 120b. The additional seal member SM4 is provided between the first through-holes 120a and the second through-holes 120b in the telescopic direction D10.

Figure 15:
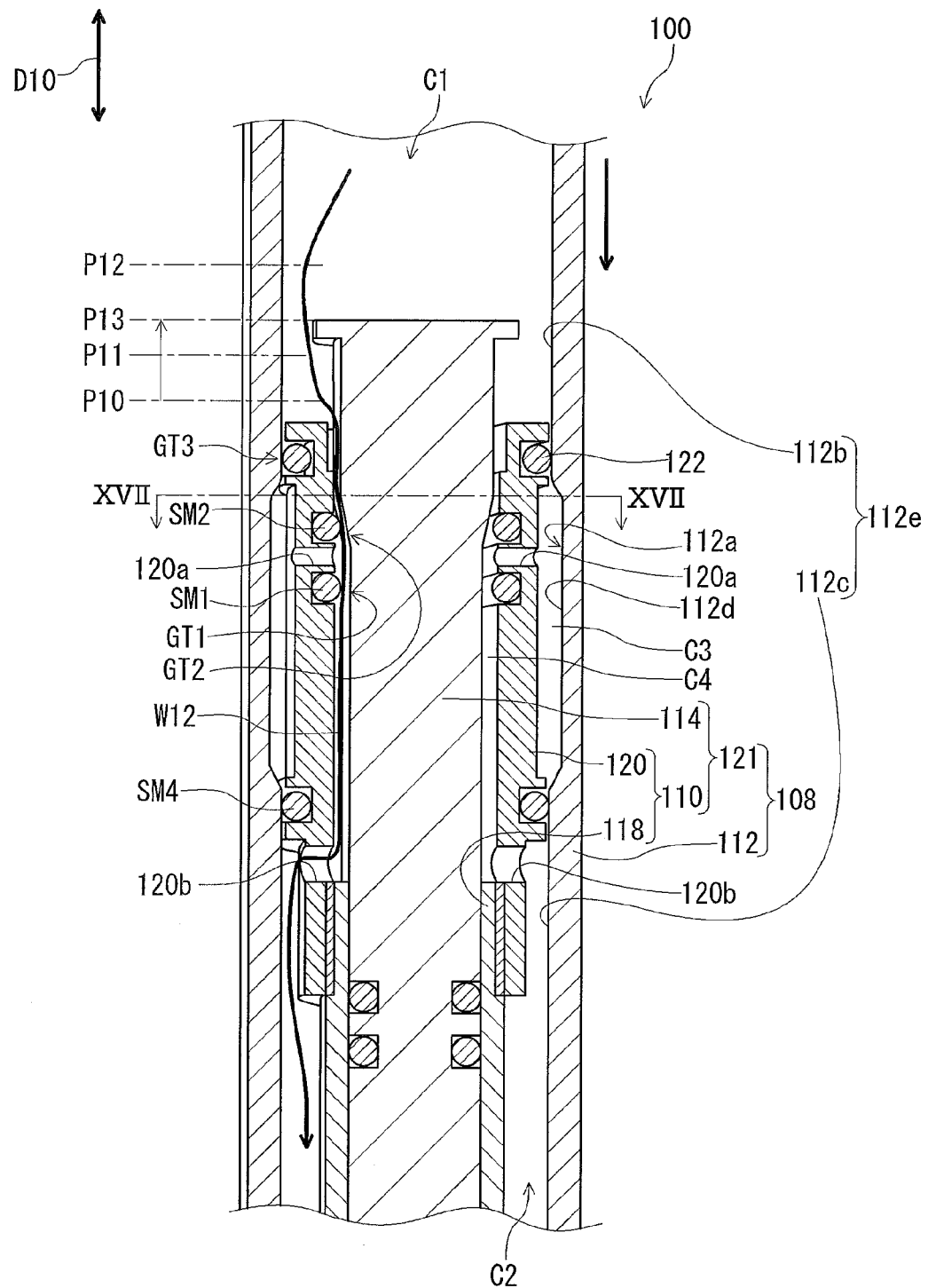
FIG. 15 is a partial cross-sectional view of the bicycle seatpost assembly illustrated in FIG. 10 (a third open position)

As seen in FIG. 15, the first gate GT1 and the second gate GT2 are open in a state where the movable member 114 is disposed at a third open position P13 different from the first open position P11 and the second open position P12 relative to the support member 110. In the illustrated embodiment, the third open position P13 is disposed between the first open position P11 and the second open position P12.

Figure 16:
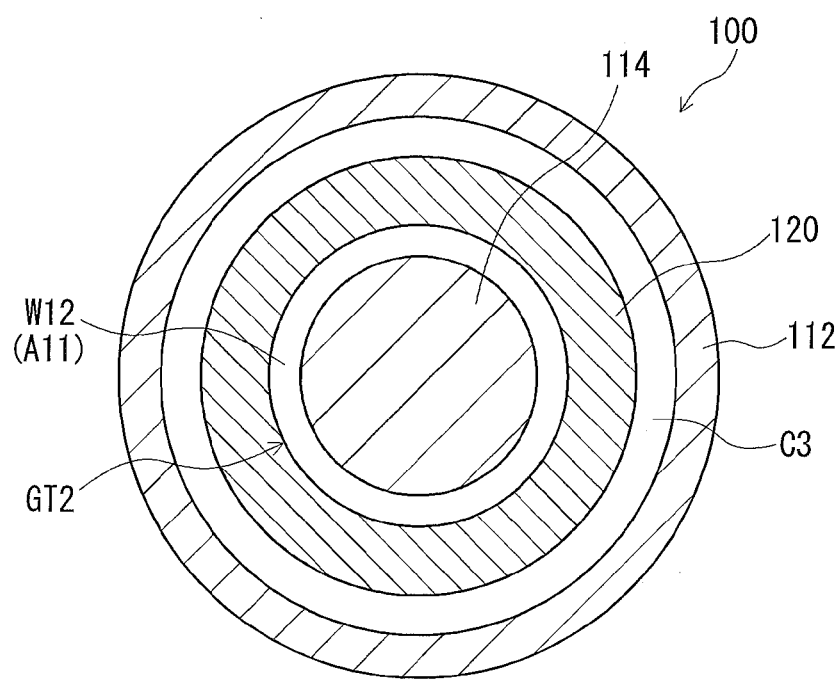
FIG. 16 is a cross-sectional view of the bicycle seatpost assembly taken along line XVI-XVI of FIG. 14 (the second open position)
Figure 17:
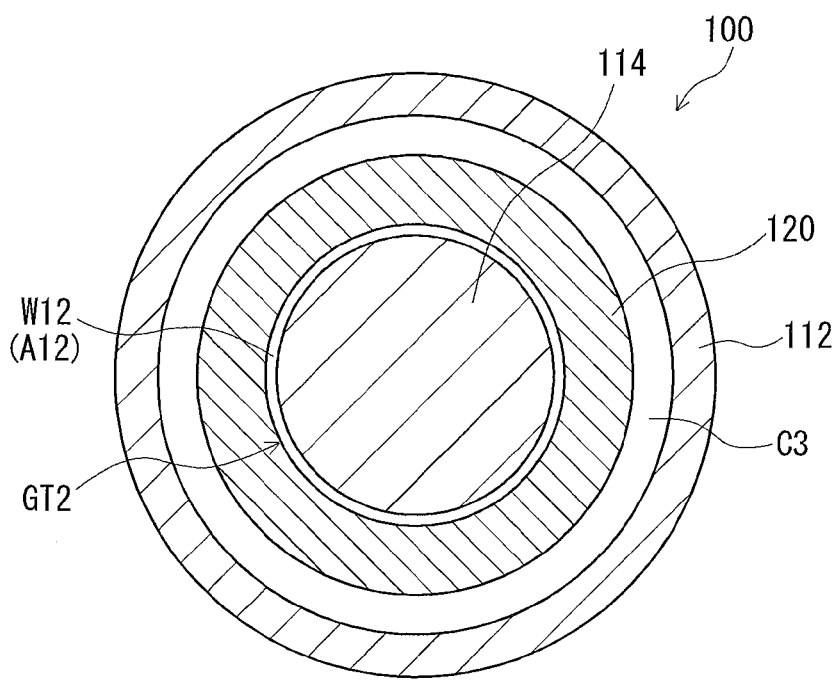
FIG. 17 is a cross-sectional view of the bicycle seatpost assembly taken along line XVII-XVII of FIG. 15 (the third open position)

As seen in FIG. 16, the second gate GT2 has a first cross-sectional area A11 in a state where the movable member 114 is disposed at the second open position P12. The first cross-sectional area A11 is defined on a cross section taken along line XVI-XVI of FIG. 14. As seen in FIG. 17, the second gate GT2 has a second cross-sectional area A12 in a state where the movable member 114 is disposed at the third open position P13. The second cross-sectional area A12 is defined on a cross section taken along line XVII-XVII of FIG. 15. As seen in FIGS. 16 and 17, the second cross-sectional area A12 is smaller than the first cross-sectional area A11. Since the second cross-sectional area A12 is smaller than the first cross-sectional area A11, fluid resistance caused by the second gate GT2 having the second cross-sectional area A12 is greater than fluid resistance caused by the second gate GT2 having the first cross-sectional area A11. Thus, the second cross-sectional area A12 of the second gate GT2 reduces the relative movement speed between the first cylinder 102 and the second cylinder 104 compared with the first cross-sectional area A11 of the second gate GT2. This allows the user to finely adjust the overall length of the bicycle seatpost assembly 100.

As seen in FIG. 11, the fluid cylinder 112 includes an inner peripheral surface 112e and a recessed inner peripheral surface 112d recessed from the inner peripheral surface 112e. The recessed inner peripheral surface 112d defines an inner diameter DM1 larger than an inner diameter DM2 defined by the inner peripheral surface 112e. The inner peripheral surface 112e includes a first inner peripheral surface 112b and a second inner peripheral surface 112c. The recessed inner peripheral surface 112d is disposed between the first inner peripheral surface 112b and the second inner peripheral surface 112c. The recessed inner peripheral surface 112d defines a recess 112a.

As seen in FIG. 12, the first passageway W11 includes a third gate GT3 configured to open and close in response to a relative position between the support member 110 and the recessed inner peripheral surface 112d. The third gate GT3 is configured to open and close the first passageway W11 provided between the first chamber C1 and the first intermediate chamber C3. The support member 110 includes a seal member 122 (a third-gate seal member) provided on an outer periphery of the support member 110. The third gate GT3 is open in a state where the seal member 122 faces the recessed inner peripheral surface 112d of the fluid cylinder 112 in the radial direction of the valve receiving member 120. More specifically, the third gate GT3 is open in a state where a space is made between the seal member 122 and the recessed inner peripheral surface 112d. The first chamber C1 is in communication with the first intermediate chamber C3 in a state where the third gate GT3 is open (i.e., in a state where the seal member 122 is disposed between an upper end and a lower end of the recessed inner peripheral surface 112d). As seen in FIG. 13, the third gate GT3 is closed in a state where the seal member 122 contacts the inner peripheral surface 112e of the fluid cylinder 112.

The operation of the bicycle seatpost assembly 100 will be described in detail below. As seen in FIG. 11, in a state where the overall length of the bicycle seatpost assembly 100 is the maximum overall length L0, the seal member 122 is disposed radially inward of the recess 112a provided in the fluid cylinder 112. The seal member 122 is spaced apart from the recessed inner peripheral surface 112d of the fluid cylinder 112 to provide a passageway W1 between the recessed inner peripheral surface 112d and the seal member 122. The passageway W1 is a part of the first passageway W11.

As seen in FIG. 12, when the operated member 16 (FIG. 10) of the bicycle operating device 10 is moved by the user from the rest position P0 to the first operated position P1, the movable member 114 is moved from the closed position P10 to the first open position P11. In a state where the movable member 114 is positioned at the first open position P11, the first chamber C1 is in communication with the second chamber C2 via the first intermediate chamber C3, the first through-holes 120a, the second intermediate chamber C4 and the second through-holes 120b. This allows the substantially incompressible fluid to flow from the first chamber C1 to the second chamber C2 via the first passageway W11, allowing the second cylinder 104 to be downwardly moved relative to the first cylinder 102 using the rider's weight applied to the seat attachment portion 106.

As seen in FIG. 13, after the seal member 122 passes through the recess 112a, the seal member 122 contacts the first inner peripheral surface 112b of the fluid cylinder 112. The third gate GT3 is closed in a state where the seal member 122 contacts the inner peripheral surface 112e of the fluid cylinder 112. This prevents the substantially incompressible fluid from flowing from the first chamber C1 to the second chamber C2, causing the second cylinder 104 to stop moving downwardly relative to the first cylinder 102 and to be fixedly positioned relative to the first cylinder 102 at a position corresponding to the first overall length L1 (FIG. 10) after the movable member 114 moves from the first open position P11 to the closed position P10. Accordingly, when the operated member 16 of the bicycle operating device 10 is moved to the first operated position P1, the second cylinder 104 can downwardly move relative to the first cylinder 102 from the maximum overall length L0 to the first overall length L1 defined by the recess 112a.

As seen FIG. 14, when the operated member 16 is moved by the user from the rest position P0 to the second operated position P2, the movable member 114 is moved from the closed position P10 to the second open position P12. In a state where the movable member 114 is positioned at the second open position P12, the first chamber C1 is in communication with the second chamber C2 via the second intermediate chamber C4 and the second through-holes 120b. This allows the substantially incompressible fluid to flow from the first chamber C1 to the second chamber C2 via the second passageway W12, allowing the second cylinder 104 to be downwardly moved relative to the first cylinder 102 using the rider's weight applied to the seat attachment portion 106.

At this time, the substantially incompressible fluid flows from the first chamber C1 to the second chamber C2 without via the first intermediate chamber C3. Accordingly, a relative position between the first cylinder 102 and the second cylinder 104 can be continuously adjusted using the bicycle operating device 10 regardless of the recess 112a.

With the bicycle seatpost assembly 100, as seen in FIG. 10, the positioning structure 108 is configured to switch the state of the bicycle seatpost assembly 100 among the first adjustable state and the second adjustable state. In the first adjustable state, the positional relationship between the first cylinder 102 and the second cylinder 104 is continuously adjustable within the first adjustable position range AR1. In the second adjustable state, the positional relationship between the first cylinder 102 and the second cylinder 104 is continuously adjustable within the second adjustable position range AR2 different from the first adjustable position range AR1. Accordingly, it is possible to easily adjust a height of the bicycle seat (not shown) using the first adjustable position range AR1 and the second adjustable position range AR2 which are different from each other. For example, it is possible to easily and/or precisely adjust the overall length of the bicycle seatpost assembly 100 from the maximum overall length L0 to the predetermined first overall length L1 using the first adjustable state.

The bicycle component B2 operated using the bicycle operating device 10 is not limited to the bicycle seatpost assembly 100. The bicycle operating device 10 can be used to operate bicycle components other than the bicycle seatpost assembly 100 if needed and/or desired.

The bicycle seatpost assembly 100 is not limited to a hydraulic adjustable seatpost such that an overall length thereof is continuously adjustable. In a case where the bicycle operating device 10 is applied to a seatpost assembly, the seatpost assembly can include a mechanical structure such that an overall length thereof is mechanically adjustable to a plurality of predetermined different lengths instead of a hydraulic mechanism.

With the bicycle operating device 10, the operated member 16 is configured to be movable relative to the base member 12 from the rest position P0 to the first operated position P1 along the first path T1 such that the operation cable 2 is pulled relative to the base member 12 by the first amount of movement M1 in the cable operating direction D2. Furthermore, the operated member 16 is configured to be movable relative to the base member 12 from the rest position P0 to the second operated position P2 along the second path T2 such that the operation cable 2 is pulled relative to the base member 12 by the second amount of movement M2 in the cable operating direction D2. The second path T2 is at least partially different from the first path T1. The second amount of movement M2 is different from the first amount of movement M1. Accordingly, the operation cable 2 can be pulled by each of the first amount of movement M1 and the second amount of movement M2 in response to operations of a single operated member (i.e., the operated member 16). This allows the structure of the bicycle operating device 10 to be simplified.

Second Embodiment

A bicycle seatpost assembly 300 in accordance with a second embodiment will be described below referring to FIGS. 18 to 22. The bicycle seatpost assembly 300 has substantially the same configuration as the bicycle seatpost assembly 100 except for an arrangement of the first adjustable position range AR1. Thus, elements having substantially the same function as those in the first embodiment will be numbered the same here, and will not be described and/or illustrated again in detail here for the sake of brevity.

Figure 18:
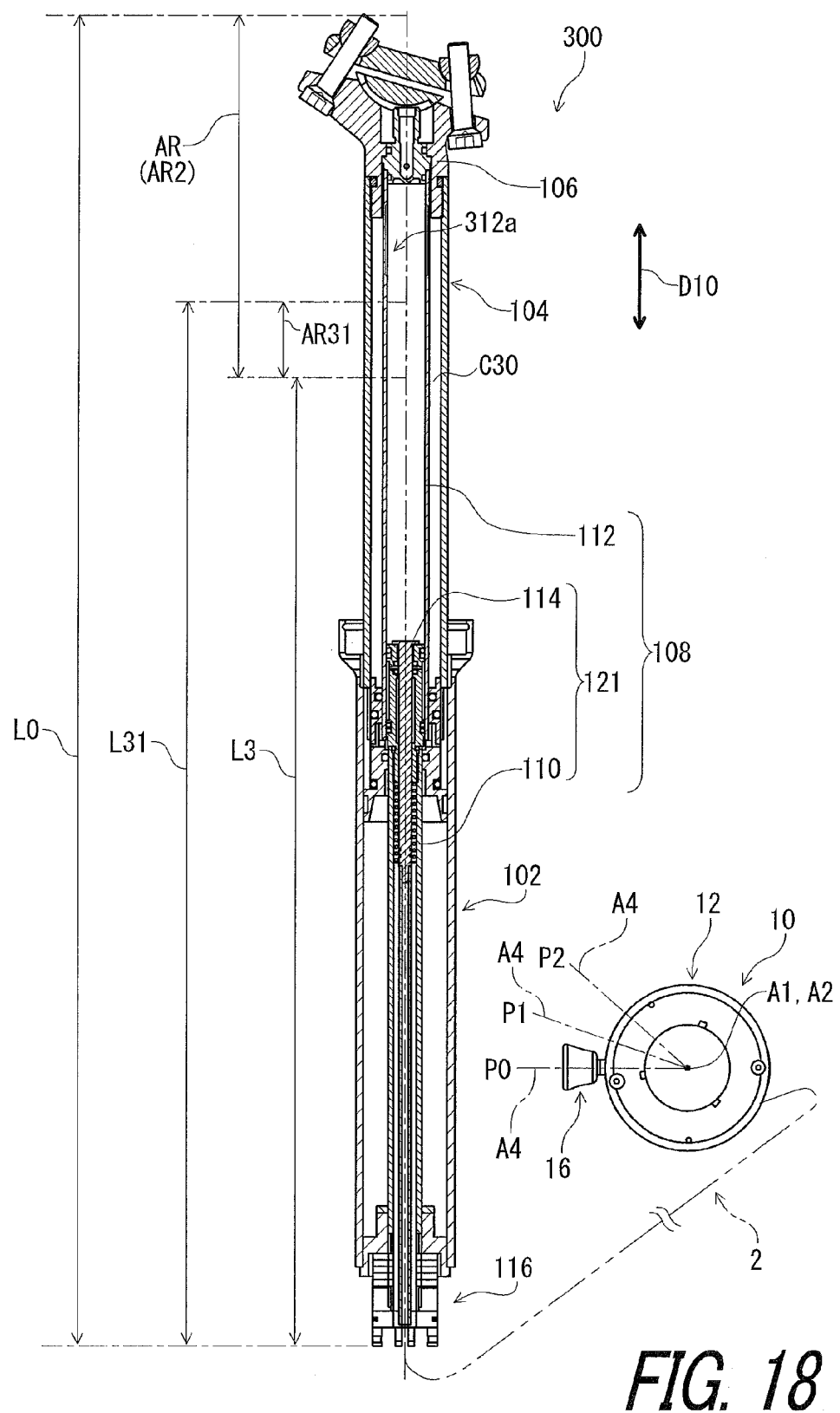
FIG. 18 is a cross-sectional view of a bicycle seatpost assembly in accordance with a second embodiment.

As seen in FIG. 18, unlike the recess 112a in accordance with the first embodiment, a recess 312a is disposed at an upper portion of the fluid cylinder 112 than the recess 112a of the first embodiment. A first adjustable position range AR31 is defined between a first maximum overall length (a third overall length L31) and a first minimum overall length (the minimum overall length L3) of the bicycle seatpost assembly 300. The second adjustable position range AR2 is defined between the second maximum overall length (the maximum overall length L0) and the second minimum overall length (the minimum overall length L3) of the bicycle seatpost assembly 300. The first maximum overall length (the third overall length L31) is different from the second maximum overall length (the maximum overall length L0). In the illustrated embodiment, the first maximum overall length (the third overall length L31) is shorter than the second maximum overall length (the maximum overall length L0). The first minimum overall length (the minimum overall length L3) is equal to the second minimum overall length (the minimum overall length L3).

Figure 19:
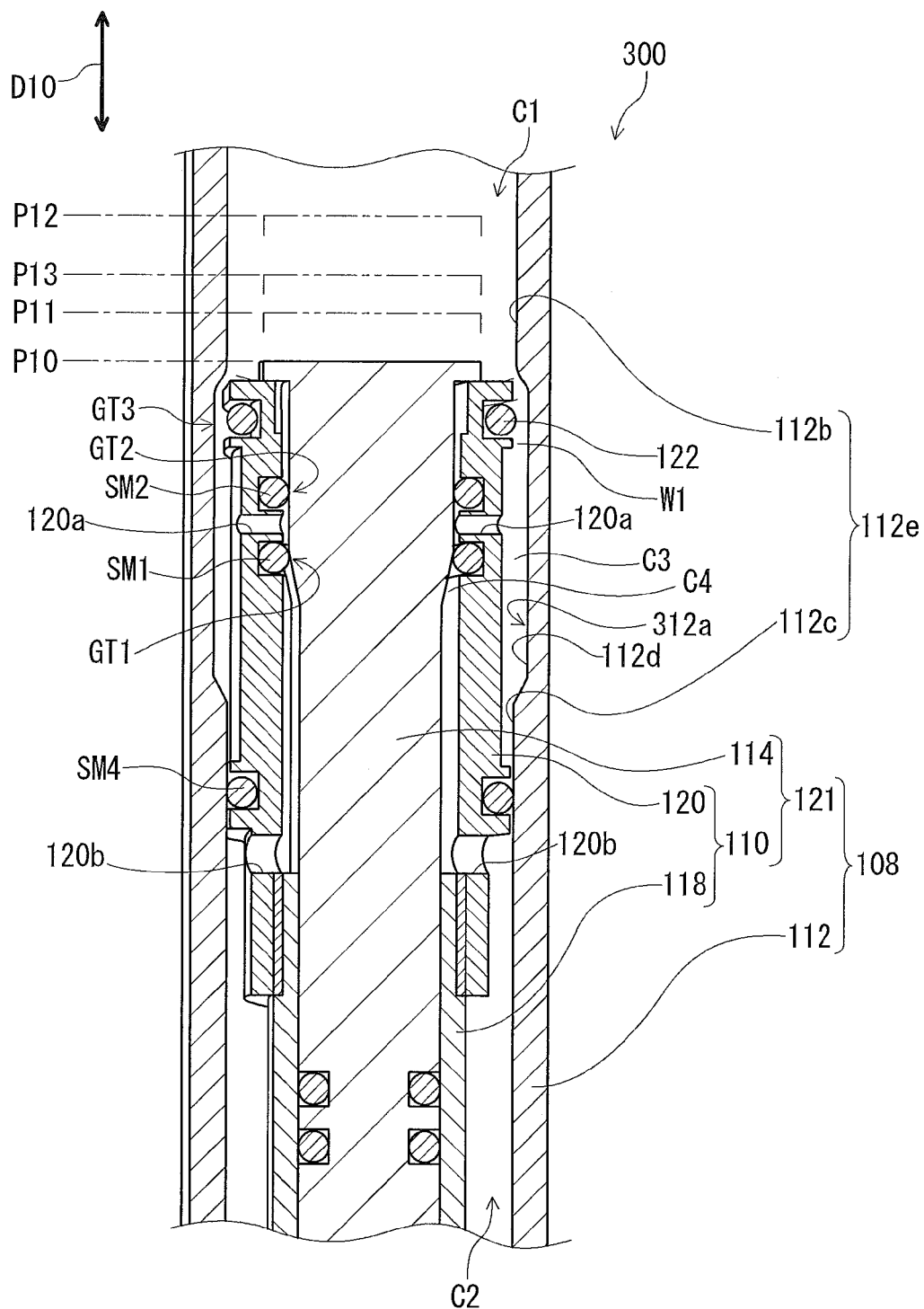
FIG. 19 is a partial cross-sectional view of the bicycle seatpost assembly illustrated in FIG. 18 (the closed position)

As seen in FIG. 19, in a state where the overall length of the bicycle seatpost assembly 300 is the minimum overall length L3, the seal member 122 is disposed radially inward of the recess 312a provided in the fluid cylinder 112. The seal member 122 is spaced apart from the recessed inner peripheral surface 112d of the fluid cylinder 112 to provide the passageway W1 between the recessed inner peripheral surface 112d and the seal member 122.

Figure 20:
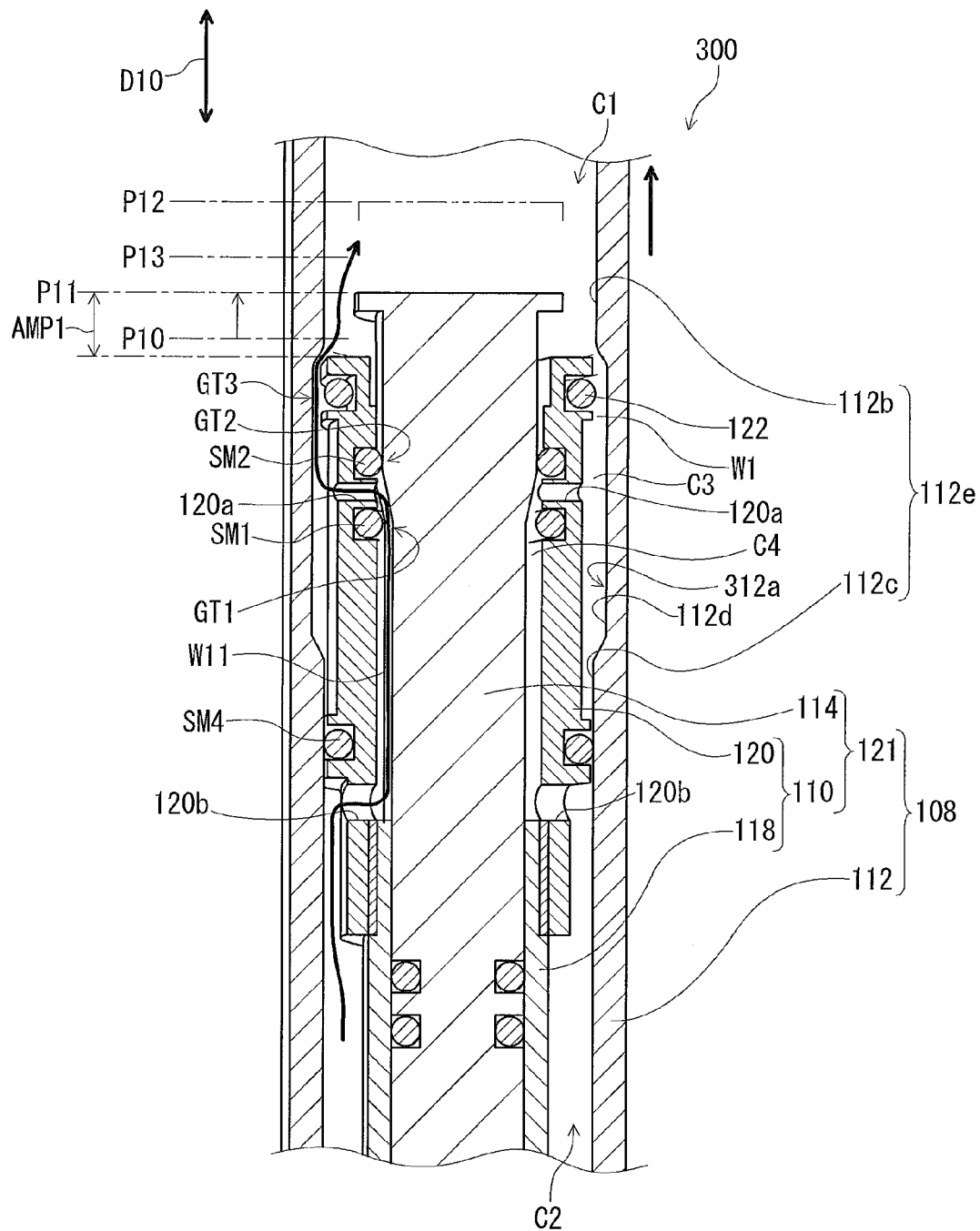
FIG. 20 is a partial cross-sectional view of the bicycle seatpost assembly illustrated in FIG. 18 (the first open position)

As seen in FIG. 20, in a state where the movable member 114 is positioned at the first open position P11, the first chamber C1 is in communication with the second chamber C2 via the first passageway W11, allowing the second cylinder 104 to be upwardly moved relative to the first cylinder 102 with pressure of compressible fluid (e.g., air) filled in a biasing chamber C30 (FIG. 18).

Figure 21:
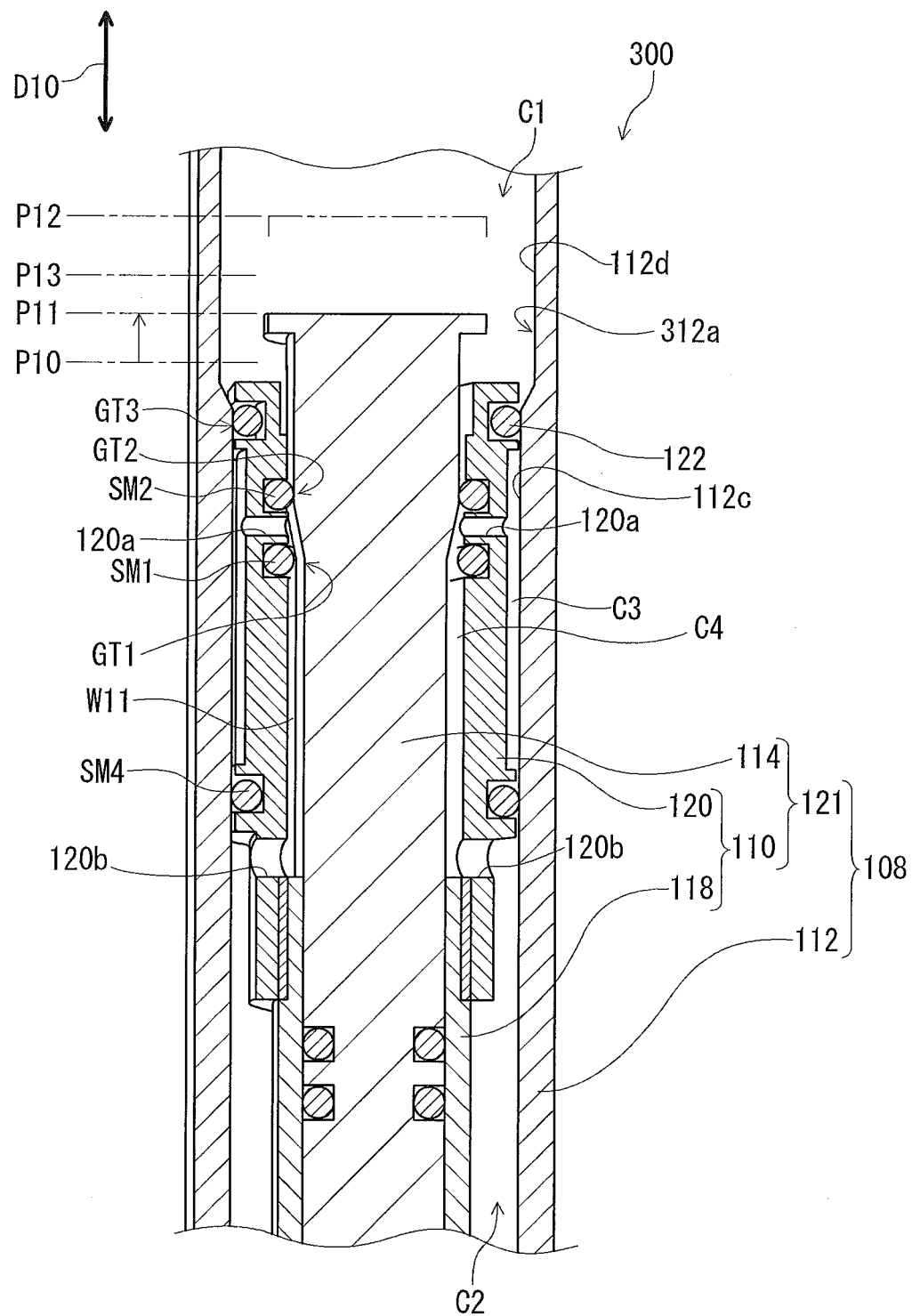
FIG. 21 is a partial cross-sectional view of the bicycle seatpost assembly illustrated in FIG. 18 (the first open position)

As seen in FIG. 21, after the seal member 122 passes through the recess 312a, the seal member 122 contacts the second inner peripheral surface 112c of the fluid cylinder 112. The third gate GT3 is closed in a state where the seal member 122 contacts the inner peripheral surface 112e of the fluid cylinder 112. This prevents the substantially incompressible fluid from flowing from the second chamber C2 to the first chamber C1, causing the second cylinder 104 to stop moving upwardly relative to the first cylinder 102 and to be fixedly positioned relative to the first cylinder 102 at a position corresponding to the third overall length L31 (FIG. 18) after the movable member 114 moves from the first open position P11 to the closed position P10. Accordingly, when the operated member 16 of the bicycle operating device 10 is moved to the first operated position P1, the second cylinder 104 can upwardly move relative to the first cylinder 102 from the minimum overall length L3 to the third overall length L31 defined by the recess 312a.

Figure 22:
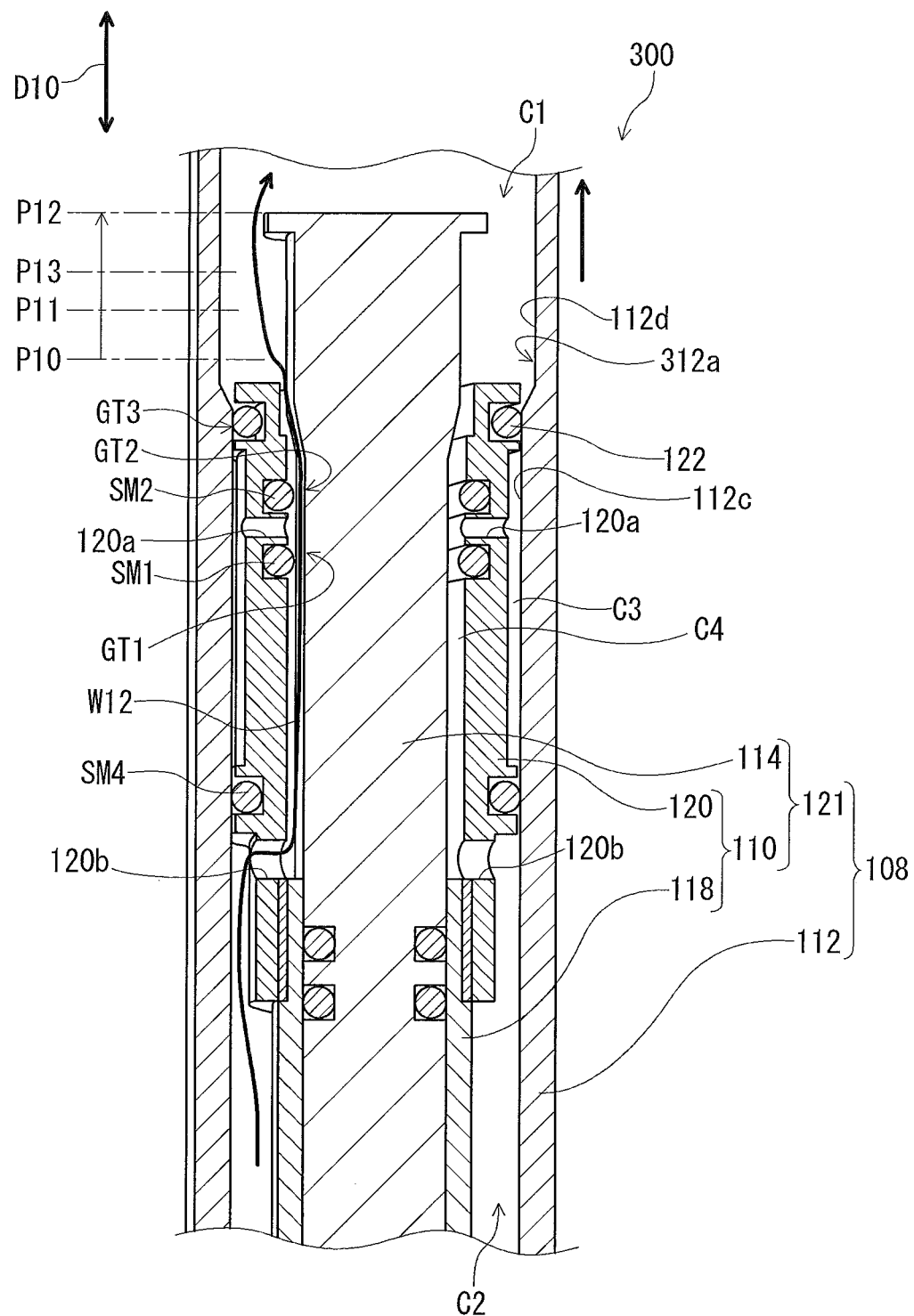
FIG. 22 is a partial cross-sectional view of the bicycle seatpost assembly illustrated in FIG. 18 (the second open position)

As seen FIG. 22, in a state where the movable member 114 is positioned at the second open position P12, the first chamber C1 is in communication with the second chamber C2 via the second intermediate chamber C4 and the second through-holes 120b. This allows the substantially incompressible fluid to flow from the second chamber C2 to the first chamber C1 via the second passageway W12, allowing the second cylinder 104 to be upwardly moved relative to the first cylinder 102 with pressure of the compressible fluid (e.g., air) filled in the biasing chamber C30 (FIG. 18).

At this time, the substantially incompressible fluid flows from the second chamber C2 to the first chamber C1 without via the first intermediate chamber C3. Accordingly, a relative position between the first cylinder 102 and the second cylinder 104 can be continuously adjusted using the bicycle operating device 10 regardless of the recess 312a.

As well as the bicycle seatpost assembly 100, the first gate GT1 and the second gate GT2 are open in a state where the movable member 114 is disposed at the third open position P13 (FIGS. 19 to 21) different from the first open position P11 and the second open position P12 relative to the support member 110. In this state, since the second cross-sectional area A12 (FIG. 17) is smaller than the first cross-sectional area A11 (FIG. 16), fluid resistance caused by the second gate GT2 having the second cross-sectional area A12 is greater than fluid resistance caused by the second gate GT2 having the first cross-sectional area A11. Thus, the second cross-sectional area A12 of the second gate GT2 reduces the relative movement speed between the first cylinder 102 and the second cylinder 104 compared with the first cross-sectional area A11 of the second gate GT2. This allows the user to finely adjust the overall length of the bicycle seatpost assembly 300.

With the bicycle seatpost assembly 300, it is possible to obtain the same advantageous effect as that of the bicycle seatpost assembly 100 in accordance with the first embodiment.

Figure 23:
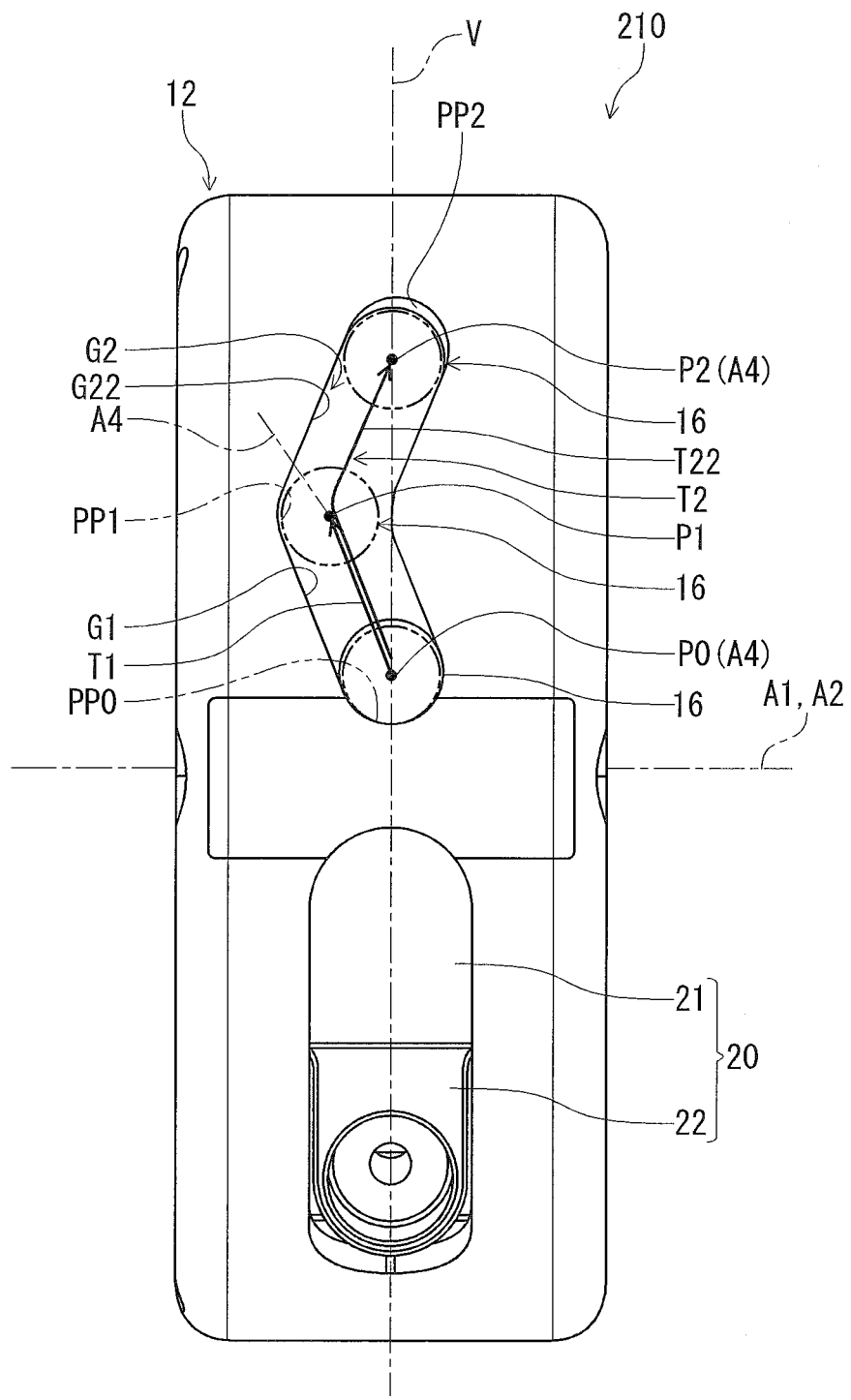
FIG. 23 is an elevational view of a bicycle operating device in accordance with a modified embodiment.

A bicycle operating device 210 as illustrated in FIG. 23 can be used for the bicycle seatpost assembly 100 or 300 instead of the bicycle operating device 10. The bicycle operating device 210 has substantially the same configuration as the bicycle operating device 10 except for a shape of the guide opening. Thus, elements having substantially the same function as those in the first embodiment will be numbered the same here, and will not be described and/or illustrated again in detail here for the sake of brevity.

In the bicycle operating device 210, the second path T2 is at least partially different from the first path T1. In the illustrated embodiment, the second path T2 is partially different from the first path T1 and is partially the same as the first path T1. The second path T2 includes the first path T1 and an additional path T22. The additional path T22 is defined from the first operated position P1 to the second operated position P2.

At least one of the first operated position P1 and the second operated position P2 is spaced apart from the virtual plane V. In the illustrated embodiment, the second operated position P2 is disposed on the virtual plane V while the first operated position P1 is spaced apart from the virtual plane V.

The second guide portion G2 is configured to guide the operated member 16 between the rest positioning portion PP0 and the second positioning portion PP2. In the illustrated embodiment, the second guide portion G2 includes the first guide portion G1 and an additional guide portion G22. The additional guide portion G22 is configured to guide the operated member 16 between the first positioning portion PP1 and the second positioning portion PP2. The first guide portion G1 is configured to allow the operated member 16 to be moved from the first operated position P1 to the second operated position P2 without via the rest position P0.

With the bicycle operating device 210, the operation cable 2 can be pulled by each of the first amount of movement M1 (FIG. 6) and the second amount of movement M2 (FIG. 7) in response to operations of a single operated member (i.e., the operated member 16). This allows the structure of the bicycle operating device 210 to be simplified as well as the bicycle operating device 10 in accordance with the first embodiment.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
a first cylinder;
a second cylinder configured to be telescopically received in the first cylinder; and
a positioning structure including a movable member movably provided in at least one of the first cylinder and the second cylinder, the positioning structure being configured to relatively position the first cylinder and the second cylinder and configured to switch a state of the bicycle seatpost assembly in response to a movement of the movable member among
a first adjustable state in which a positional relationship between the first cylinder and the second cylinder is continuously adjustable within a first adjustable position range, and
a second adjustable state in which the positional relationship between the first cylinder and the second cylinder is continuously adjustable within a second adjustable position range different from the first adjustable position range.

2. The bicycle seatpost assembly according to claim 1, wherein
the first adjustable position range at least partially overlaps with the second adjustable position range.

3. The bicycle seatpost assembly according to claim 1, wherein
the first adjustable position range has a total length different from a total length of the second adjustable position range.

4. The bicycle seatpost assembly according to claim 1, wherein
the positioning structure is configured to switch the state of the bicycle seat post assembly among the first adjustable state and the second adjustable state in response to an operation of a bicycle operating device.

5. The bicycle seatpost assembly according to claim 1, wherein
the first adjustable position range is defined between a first maximum overall length and a first minimum overall length of the bicycle seatpost assembly,
the second adjustable position range is defined between a second maximum overall length and a second minimum overall length of the bicycle seatpost assembly, and
the first minimum overall length is different from the second minimum overall length.

6. The bicycle seatpost assembly according to claim 5, wherein
the first maximum overall length is equal to the second maximum overall length.

7. The bicycle seatpost assembly according to claim 1, wherein
the first adjustable position range is defined between a first maximum overall length and a first minimum overall length of the bicycle seatpost assembly,
the second adjustable position range is defined between a second maximum overall length and a second minimum overall length of the bicycle seatpost assembly, and
the first maximum overall length is different from the second maximum overall length.

8. The bicycle seatpost assembly according to claim 7, wherein
the first minimum overall length is equal to the second minimum overall length.

9. The bicycle seatpost assembly according to claim 1, wherein
the first cylinder and the second cylinder are configured to be movable relative to each other in a telescopic direction, and
the positioning structure is configured to switch the state of the bicycle seatpost assembly in response to the movement of the movable member among
the first adjustable state in which the positional relationship between the first cylinder and the second cylinder is continuously adjustable within the first adjustable position range in the telescopic direction, and
the second adjustable state in which the positional relationship between the first cylinder and the second cylinder is continuously adjustable within the second adjustable position range different from the first adjustable position range in the telescopic direction.

10. The bicycle seatpost assembly according to claim 9, wherein
the movable member is movable relative to the at least one of the first cylinder and the second cylinder in the telescopic direction.

11. The bicycle seatpost assembly according to claim 10, wherein
the movable member is movable relative to the at least one of the first cylinder and the second cylinder in the telescopic direction between a first open position and a second open position,
the positioning structure switches the state of the bicycle seatpost assembly to the first adjustable state in a state where the movable member is positioned at the first open position, and
the positioning structure switches the state of the bicycle seatpost assembly to the second adjustable state in a state where the movable member is positioned at the second open position.

12. A bicycle seatpost assembly comprising:
a first cylinder;
a second cylinder configured to be telescopically received in the first cylinder; and
a positioning structure configured to relatively position the first cylinder and the second cylinder and configured to switch a state of the bicycle seatpost assembly among
a first adjustable state in which a positional relationship between the first cylinder and the second cylinder is continuously adjustable within a first adjustable position range, and
a second adjustable state in which the positional relationship between the first cylinder and the second cylinder is continuously adjustable within a second adjustable position range different from the first adjustable position range,
the positioning structure including a first chamber, a second chamber, a first passageway, and a second passageway, the first chamber being in communication with the second chamber via the first passageway in the first adjustable state of the bicycle seatpost assembly, the first chamber being in communication with the second chamber via the second passageway in the second adjustable state of the bicycle seatpost assembly, and the positioning structure being configured to switch a fluid passageway among the first passageway and the second passageway to switch the state of the bicycle seatpost assembly among the first adjustable state and the second adjustable state.

13. The bicycle seatpost assembly according to claim 12, wherein the positioning structure includes a support member, a fluid cylinder and a movable member, the support member is configured to be telescopically movable relative to the fluid cylinder, the movable member being configured to be movable relative to the support member, and the movable member is configured to switch the fluid passageway among the first passageway and the second passageway in accordance with a position of the movable member relative to the support member.

14. The bicycle seatpost assembly according to claim 13, wherein the first passageway and the second passageway are at least partially disposed between the support member and the movable member.

15. The bicycle seatpost assembly according to claim 13, wherein the positioning structure is configured to change a position of the movable member relative to the support member in response to an operation of a bicycle operating device.

16. The bicycle seatpost assembly according to claim 13, wherein the first passageway includes a first gate configured to open and close in response to the position of the movable member relative to the support member, and the second passageway includes a second gate configured to open and close in response to a position of the movable member relative to the support member and provided at a position different from a position of the first gate.

17. The bicycle seatpost assembly according to claim 16, wherein the fluid cylinder includes an inner peripheral surface and a recessed inner peripheral surface recessed from the inner peripheral surface, the recessed inner peripheral surface defines an inner diameter larger than an inner diameter defined by the inner peripheral surface, and the first passageway includes a third gate configured to open and close in response to a relative position between the support member and the recessed inner peripheral surface.

18. The bicycle seatpost assembly according to claim 17, wherein the support member includes a seal member provided on an outer periphery of the support member, the third gate is open in a state where the seal member faces the recessed inner peripheral surface of the fluid cylinder, and the third gate is closed in a state where the seal member contacts the inner peripheral surface of the fluid cylinder.

19. The bicycle seatpost assembly according to claim 16, wherein the first gate is open in a state where the movable member is disposed at a first open position, and the first gate and the second gate are open in a state where the movable member is disposed at a second open position different from the first open position relative to the support member.

20. The bicycle seatpost assembly according to claim 19, wherein the first gate and the second gate are closed in a state where the movable member is disposed at a closed position different from the first open position and the second open position relative to the support member.

21. The bicycle seatpost assembly according to claim 19, wherein the second gate is closed in a state where the movable member is disposed at the first open position.

22. The bicycle seatpost assembly according to claim 19, wherein the first gate and the second gate are open in a state where the movable member is disposed at a third open position different from the first open position and the second open position relative to the support member, the second gate has a first cross-sectional area in a state where the movable member is disposed at the second open position, the second gate has a second cross-sectional area in a state where the movable member is disposed at the third open position, and the second cross-sectional area is smaller than the first cross-sectional area.

23. The bicycle seatpost assembly according to claim 19, wherein the movable member is movably mounted to the support member and is configured to protrude from the support member, the movable member protrudes from the support member by a first amount of protrusion in a state where the movable member is disposed at the first open position, and the movable member protrudes from the support member by a second amount of protrusion different from the first amount of protrusion in a state where the movable member is disposed at the second open position.

24. A bicycle seatpost assembly comprising:

a first cylinder;

a second cylinder configured to be telescopically received in the first cylinder; and a positioning structure configured to relatively position the first cylinder and the second cylinder and configured to switch a state of the bicycle seatpost assembly among a first adjustable state in which a positional relationship between the first cylinder and the second cylinder is continuously adjustable within a first adjustable position range, and a second adjustable state in which the positional relationship between the first cylinder and the second cylinder is continuously adjustable within a second adjustable position range different from the first adjustable position range, the positioning structure being configured to switch the state of the bicycle seat post assembly among the first adjustable state and the second adjustable state in response to an operation of a bicycle operating device, the positioning structure being configured to switch the state of the bicycle seatpost assembly to the first adjustable state in response to a first operation of the bicycle operating device, the positioning structure being configured to switch the state of the bicycle seatpost assembly to the second adjustable state in response to a second operation of the bicycle operating device, and in the bicycle operating device, at least one of a movement amount and a movement direction of the first operation being different from at least one of a movement amount and a movement direction of the second operation.

* * * * *